US009859982B2

United States Patent
Yeo et al.

(10) Patent No.: US 9,859,982 B2
(45) Date of Patent: *Jan. 2, 2018

(54) DISTRIBUTED ANTENNA SYSTEM

(71) Applicant: SOLID, INC., Seongnam-si, Gyeonggi-do (KR)

(72) Inventors: Yeongshin Yeo, Gwangmyeong-si (KR); Hwansun Lee, Bucheon-si (KR); Youngju You, Incheon (KR)

(73) Assignee: SOLiD, INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,418

(22) Filed: Feb. 7, 2017

(65) Prior Publication Data

US 2017/0149505 A1 May 25, 2017

Related U.S. Application Data

(63) Continuation of application No. 15/079,783, filed on Mar. 24, 2016, which is a continuation of application No. PCT/KR2015/004115, filed on Apr. 24, 2015.

(30) Foreign Application Priority Data

Apr. 24, 2015 (KR) .................. 10-2015-0057898

(51) Int. Cl.
*H04J 14/00* (2006.01)
*H04B 10/2575* (2013.01)
(Continued)

(52) U.S. Cl.
CPC ....... *H04B 10/25753* (2013.01); *H04B 7/022* (2013.01); *H04B 10/40* (2013.01)

(58) Field of Classification Search
CPC .......... H04B 10/2575; H04B 10/25752; H04B 10/25753; H04B 10/27; H04B 10/25758; H04W 16/24; H04W 16/26
(Continued)

(56) References Cited

U.S. PATENT DOCUMENTS 6,801,767 B1 10/2004 Schwartz et al.
2010/0128676 A1 5/2010 Wu et al.
(Continued)

FOREIGN PATENT DOCUMENTS

WO 2011/098861 A1 8/2011

OTHER PUBLICATIONS

International Search Report of PCT/KR/2015/004115 dated Feb. 23, 2016.
(Continued)

*Primary Examiner* — Hanh Phan
(74) *Attorney, Agent, or Firm* — Sughrue Mion, PLLC

(57) ABSTRACT

A distributed antenna system includes a headend device for generating a downlink transmission signal by combining a plurality of downlink RF signals in different frequency bands, received from a plurality of base stations, and converting the downlink transmission signal into a downlink optical signal, a main remote device for receiving the downlink optical signal from the headend device, converting the downlink optical signal into the downlink transmission signal, and amplifying the plurality of downlink RF signals included in the downlink transmission signal, and a sub-remote device for receiving the downlink transmission signal distributed from the main remote device, and amplifying the plurality of downlink RF signals included in the received downlink transmission signal.

20 Claims, 13 Drawing Sheets

(51) Int. Cl.
*H04B 10/40* (2013.01)
*H04B 7/022* (2017.01)

(58) Field of Classification Search
USPC ... 398/115, 116, 117, 66, 67, 68, 69, 70, 71,
398/72, 98, 99, 100, 45, 48, 49, 79;
445/562.1, 426, 561, 422.1, 424, 445;
370/328, 329, 338, 352, 392, 389, 468
See application file for complete search history.

(56) References Cited

U.S. PATENT DOCUMENTS

| | | |
|---|---|---|
| 2013/0195467 A1 | 8/2013 | Schmid et al. |
| 2013/0236180 A1 | 9/2013 | Kim et al. |
| 2014/0064730 A1 | 3/2014 | Ko |
| 2014/0072299 A1* | 3/2014 | Stapleton ......... H04B 10/25754 398/45 |
| 2014/0269318 A1 | 9/2014 | Hasarchi et al. |
| 2014/0308044 A1 | 10/2014 | Heidler et al. |

OTHER PUBLICATIONS

Office Action issued in parent U.S. Appl. No. 15/079,783 dated Jun. 2, 2016.

Notice of Allowance issued in parent U.S. Appl. No. 15/079,783 dated Nov. 7, 2016.

\* cited by examiner

DISTRIBUTED ANTENNA SYSTEM

CROSS REFERENCE TO RELATED APPLICATIONS

This application is a continuation of application Ser. No. 15/079,783 filed Mar. 24, 2016, which is a continuation of International Application No. PCT/KR2015/004115, filed Apr. 24, 2015, and based upon and claims the benefit of priority from Korean Patent Application No. 10-2015-0057898 filed Apr. 24, 2015, the contents of which are incorporated herein by reference in their entireties.

BACKGROUND

1. Field

The inventive concept relates to a distributed antenna system, and more particularly, to a distributed antenna system capable of facilitating manager's operation, reducing installation and operation costs, and extending coverage.

2. Description of Related Art

As the use of mobile communication services is rapidly increased with the development of mobile communication technology, users desire to stably receive communication services without any temporal and spatial limitations. However, as shadow areas are formed due to limitations including limited outputs of base stations, positions and peripheral topography of the base stations, etc., there is a problem in that providers have difficulty in providing users with smooth communication services. A distributed antenna system (DAS) is used as a plan for solving this problem.

The DAS is installed in areas in which radio waves are not received or are weakly received, such as interiors of buildings, basements of buildings, subways, tunnels, apartment complexes, and stadiums, to provide communication services up to shadow areas that signals of base stations hardly reach, thereby extending the coverage of the base stations. The DAS is configured with a headend device communicatively connected to base stations and at least one remote device which is connected to the headend device through an optical transport medium and communicatively connected to user terminals.

Recently, the DAS has employed a neutral host architecture to integrally support various services (e.g., multi-band services, multi-carrier services, etc.) or services of a plurality of providers. As the design complexity of the headend device and the remote device in the DAS is increased due to the employment of the neutral host architecture, a manager has difficulty in quickly coping with a trouble, etc., which occurs during operation. In addition, it becomes more difficult to efficiently cope with alternation of providers, services, etc., due to a change in operational environment.

Meanwhile, the DAS necessarily ensure a broad coverage while satisfying requirements to reduce facilities and operation cost of providers, and it is required for the DAS to extend or change predetermined coverage, corresponding to a change in operational environment. In the DAS, coverage is generally ensured by disposing a headend device at a local site and disposing a plurality of remote devices at different remote sites. However, when the number of remote devices connected to the headend device is increased or the position of each remote device is changed so as to ensure a broad coverage and extend coverage, installation and operation costs are increased due to additional equipments, lines, etc., and therefore, it is difficult for the DAS to satisfy requirements to reduce providers' cost.

SUMMARY

An embodiment of the inventive concept is directed to a distributed antenna system capable of increasing manager's convenience, improving flexibility and scalability corresponding to a change in environment, reducing installation and operation costs, and efficiently extend coverage.

According to an aspect of the inventive concept, there is provided a distributed antenna system, comprising: a headend device configured to generate a downlink transmission signal by combining a plurality of downlink RF signals in different frequency bands, received from a plurality of base stations, and convert the downlink transmission signal into a downlink optical signal; a main remote device configured to receive the downlink optical signal from the headend device, convert the downlink optical signal into the downlink transmission signal, and amplify the plurality of downlink RF signals included in the downlink transmission signal; and a sub-remote device configured to receive the downlink transmission signal distributed from the main remote device, and amplify the plurality of downlink RF signals included in the received downlink transmission signal, wherein the main remote device includes a plurality of main-side band processing units cascade-connected to each other to transmit the downlink transmission signal from a front end to a rear end thereof, the plurality of main-side band processing units each amplifying a downlink RF signal in a corresponding frequency band among the plurality of downlink RF signals included in the downlink transmission signal.

In the distributed antenna system according to the inventive concept, a manager can easily cope with the occurrence of abnormality of a specific service, etc., thereby improving convenience of operation and management. Also, it is possible to properly cope with a change in operational environment such as alternation of providers or services, thereby improving flexibility and scalability. Further, it is possible to ensure a broad coverage and extend or change coverage.

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF EXEMPLARY EMBODIMENTS

Figure 1:
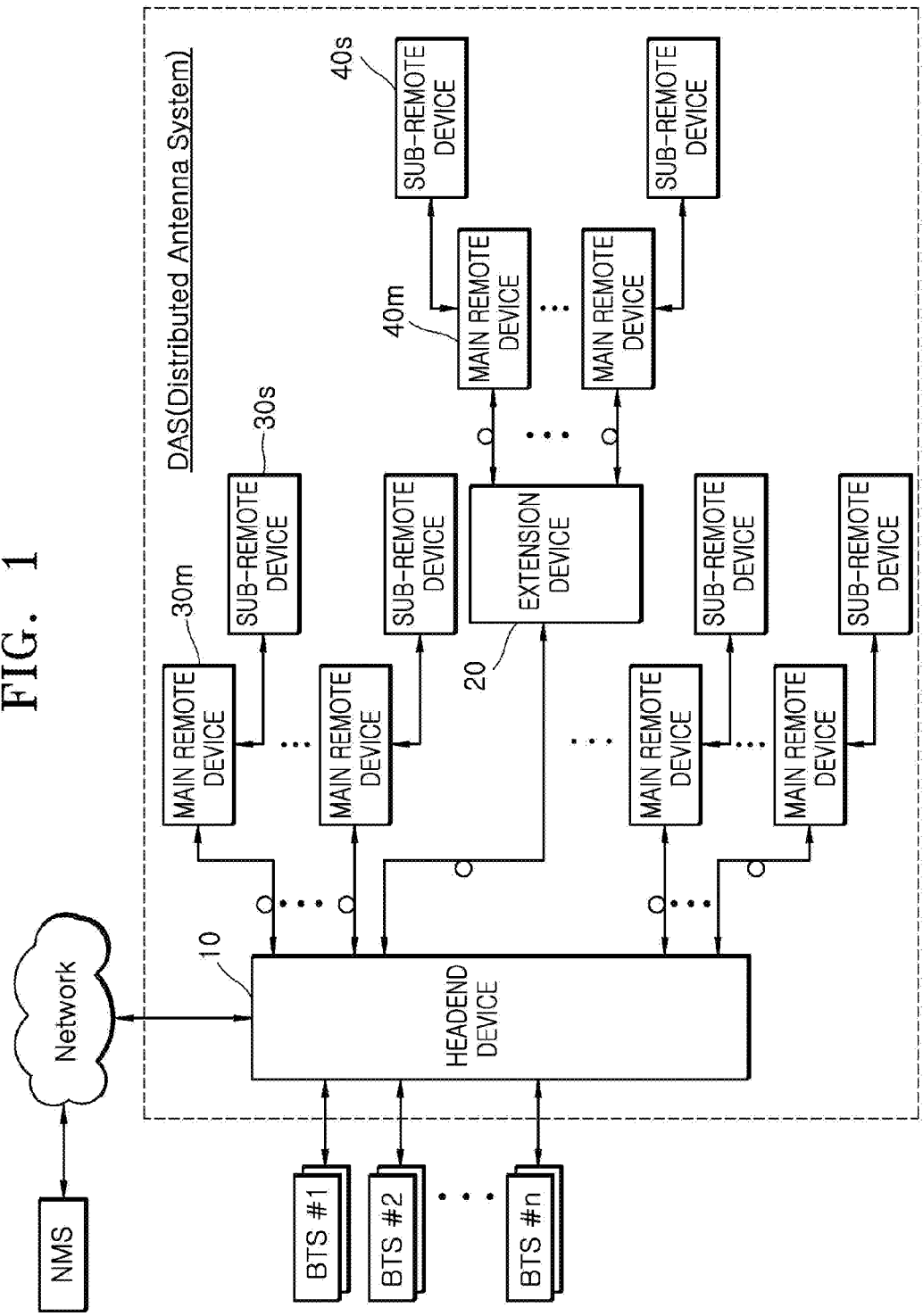
FIG. 1 is a diagram exemplarily showing a topology of a distributed antenna system according to an embodiment of the inventive concept.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

It is noted that the components of the inventive concept are categorized based on each main function that each component has. Namely, two or more than two component units, which will be described below, may be combined into one component unit or one unit may be classified into two or more than two component units for each function. Each of the component units, which will be described below, should be understood to additionally perform part or all of the functions that another component has, in addition to the main function that the component itself has, and in addition, part of the functions that each component unit has may be exclusively performed by another component unit.

A distributed antenna system according to an embodiment of the inventive concept is a coverage system for in-building services, which perform voice communication and data communication with high quality and seamless access. Also, the distributed antenna system is a system for servicing, through at least one antenna, analog and digital phone systems that are serviced in a plurality of bands.

The distributed antenna system according to the embodiment of the inventive concept improves inferior radio wave environment in buildings, improves poor received signal strength indication (RSSI) and chip energy/others interference (Ec/Io) that is total reception sensitivity of a mobile terminal, and services mobile communication up to the corners of buildings, so that a communication service user can freely use communication services at any place in a building.

The distributed antenna system according to the embodiment of the inventive concept can support mobile communication standards used all over the world. For example, the distributed antenna system can support a very high frequency (VHF), an ultra high frequency (UHF), frequencies having bands of 700 MHz, 800 MHz, 850 MHz, 900 MHz, 1900 MHz, 2100 MHz, 2600 MHz, etc., and FDD and TDD type services. In addition, the distributed antenna system can support a plurality of mobile communication standards such as advanced mobile phone service (AMPS) that is a representative analog mobile communication service, and time-division multiplexing access (TDMA), code division multiple access (CDMA), wideband code division multiple access (WCDMA), high speed downlink packet access (HSDPA), long term evolution (LET), and long term evolution advanced (LTE-A), which are digital mobile communication services.

Hereinafter, embodiments of the inventive concept will be sequentially described in detail with reference to the accompanying drawings.

FIG. 1 is a diagram exemplarily showing a topology of a distributed antenna system according to an embodiment of the inventive concept.

Referring to FIG. 1, the distributed antenna system (DAS) may include a headend device 10 communicatively connected to base stations, the headend device 10 serving as a headend node, an extension device 20 serving as an extension node, and a plurality of main remote devices 30*m* and 40*m* and a plurality of sub-remote devices 30*s* and 40*s*, which serve as remote nodes and are respectively disposed at remote service positions to be communicatively connected to user terminals. The DAS may be implemented as an analog DAS or a digital DAS. However, the inventive concept is not limited thereto. The DAS may be implemented as the digital DAS, and, when necessary, the DAS may be implemented as a hybrid of the analog DAS and the digital DAS (i.e., performance of analog processing on some nodes and digital processing on the other nodes). Hereinafter, a case where the DAS is implemented as the analog DAS will be described as an example.

Meanwhile, FIG. 1 illustrates an example of the topology of the DAS, and the DAS may have various topologies in consideration of particularity of its installation area and application field (e.g., in-building, subway, hospital, stadium, etc.). That is, the number of the headend device 10, the extension device 20, the main remote devices 30*m* and 40*m*, and the sub-remote devices 30*s* and 40*s* and upper/lower end connection relations between the headend device 10, the extension device 20, the main remote devices 30*m* and 40*m*, and the sub-remote devices 30*s* and 40*s* may be different from those of FIG. 1. For example, in FIG. 1, it is illustrated that the sub-remote devices 30*s* are respectively connected to lower ends of the main remote devices 30*m* connected to the headend device 10, and the sub-remote devices 40*s* are respectively connected to lower ends of the main remote devices 40*m* connected to the extension device 20. However, corresponding sub-remote devices 30*s* and 40*s* may not be connected to the lower ends of at least some main remote devices 30*m* and 40*m*.

In the DAS, the extension device 20 may be used when the number of branches to be branched in a star structure from the headend device 10 is limited as compared with the number of remote devices required to be installed. Therefore, the extension device 20 may be omitted when only the headend device 10 sufficiently covers the number of remote devices required to be installed, when a plurality of headend devices 10 are installed, or the like.

Each node and its function in the DAS will be described in detail. First, the headend device 10 may serve as an interface with base stations. In FIG. 1, it is illustrated that the headend device 10 is connected to first to nth base stations BTS #1 to #n (here, n is a natural number of 2 or more) corresponding to different providers. However, the headend device 10 may be connected to base stations for each service frequency band of a specific provider or for each sector.

In general, a radio frequency (RF) signal transmitted to a base station is a signal with high power. Therefore, the headend device 10 may convert the RF signal with high power into a signal with power suitable to be processed in each node. The headend device 10 may convert a high-power RF signal for each frequency band or for each sector into a low-power RF signal. The headend device 10 may combine low-power RF signals and distribute the combined signal to the extension device 20 or the main remote devices 30*m*.

The extension device 20 may transmit the combined signal transmitted from the headend device 10 to the main remote devices 40*m* connected to the extension device 20.

The main remote device 30*m* may separate the combined signal transmitted from the headend device 10 for each frequency band and perform signal processing, such as amplification, on the separated signals. The main remote device 30*m* may distribute the combined signal transmitted from the headend device 10 to the corresponding sub-remote device 30*s*. The sub-remote device 30*s* may separate the combined signal transmitted from the main remote device 30*m* for each frequency band and perform signal processing, such as amplification, on the separated signals.

The main remote device 40*m* may separate the combined signal transmitted from the extension device 20 for each frequency band and perform signal processing, such as amplification, on the separated signals. The main remote device 40*m* may distribute the combined signal transmitted from the extension device 20 to the corresponding sub-remote device 40*s*. The sub-remote device 40*s* may separate the combined signal transmitted from the main remote device 40*m* for each frequency band and perform signal processing, such as amplification, on the separated signals.

Accordingly, each of the main remote devices 30*m* and 40*m* and the sub-remote devices 30*s* and 40*s* may transmit base station signals to user terminals in its own service coverage through a service antenna (not shown).

Meanwhile, in FIG. 1, it is illustrated that the plurality of base stations BTS #1 to #n and the headend device 10 are connected to each other through an RF cable, and all devices from the headend device 10 to the extension device 20 and the main remote devices 30*m* and all devices from the extension device 20 to the main remote devices 40*m* are connected to each other through an optical cable. However, the signal transport media between these devices may be variously modified. For example, at least one of connection between the headend device 10 and the extension device 20, connection between the headend device 10 and the main remote device 30*m*, and connection between the extension device and the main remote device 40*m* may be made through an RF cable, a twist cable, a UTP cable, etc., as well as the optical cable.

In FIG. 1, it is illustrated that connection between the main remote device 30*m* and the sub-remote device 30*s* and connection between the main remote device 40*m* and the sub-remote device 40*s* are made through the RF cable. However, the signal transport medium between these devices may be variously modified. For example, the RF cable may be replaced with the optical cable, the UTP cable, etc.

Hereinafter, this will be described based on FIG. 1. Therefore, in the DAS, each of the headend device 10, the extension device 20, and the main remote devices 30*m* and 40*m* may include an optical transceiver module for transmitting/receiving optical signals through electrical-to-optical conversion/optical-to-electrical conversion. When connection between nodes is made through a single optical cable, each of the headend device 10, the extension device 20, and the main remote devices 30*m* and 40*m* may include a wavelength division multiplexing (WDM) element.

The DAS may be connected, through a network, an external management device (not shown), e.g., a network management server or system (NMS), a network operation center, etc. Accordingly, a manager can remotely monitor statuses and problems of each node in the DAS and remotely control operations of each node.

Figure 2:
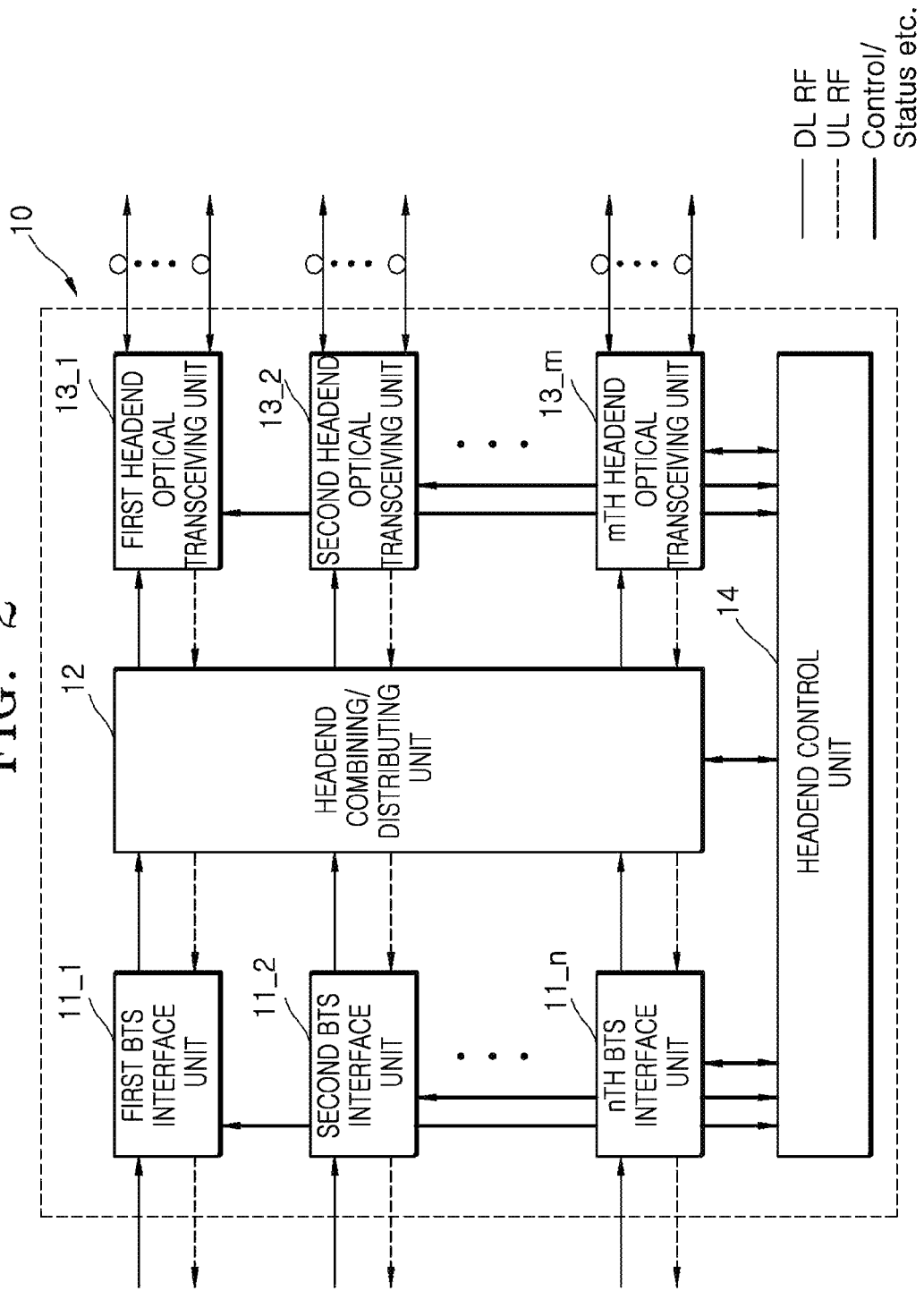
FIG. 2 is a diagram schematically showing some components of a headend device according to an embodiment of the inventive concept.

FIG. 2 is a diagram schematically showing some components of a headend device according to an embodiment of the inventive concept. For convenience of illustration, the embodiment of the inventive concept will be described with reference FIG. 2 together with FIG. 1.

Referring to FIG. 2, the headend device 10 may include first to nth base station interface units 11_1 to 11_*n*(here, n is a natural number of 2 or more), a headend combining/distributing unit 12, first to mth headend optical transceiving unit 13_1 to 13_*m*(here, m is a natural number of 2 or more), and a headend control unit 14.

Each of the first to nth base station interface unit s 11_1 to 11_*n* may be connected to a corresponding base station among the first to nth base stations BTS #1 to #n. However, the inventive concept is not limited thereto. In another embodiment, at least two base station interface unit s among the first to nth base station interface unit s 11_1 to 11_*n* may be connected to any one base station among the first to nth base stations BTS #1 to #n.

Each of the first to nth base station interface unit s 11_1 to 11_*n* may receive a downlink RF signal from the corresponding base station among the first to nth base stations BTS #1 to #n. The downlink RF signals respectively received by the first to nth base station interface unit s 11_1 to 11_*n* may have different frequency bands.

Each of the first to nth base station interface unit s 11_1 to 11_*n* may control power of the input downlink RF signal and output the downlink RF signal with the controlled power to the headend combining/distributing unit 12. For example, each of the first to nth base station interface unit s 11_1 to 11_*n* may decrease the power of the input downlink RF signal and output the downlink RF signal with the decreased power to the headend combining/distributing unit 12.

Each of the first to nth base station interface unit s 11_1 to 11_*n* may receive of a plurality of combined uplink transmission signals from the headend combining/distributing unit 12. Here, the plurality of combined uplink transmission signals may be signals obtained by combining uplink transmission signals output from the following first to mth headend optical transceiving units 13_1 to 13_*m* through the headend combining/distributing unit 12. The uplink transmission signals may include uplink RF signals in different frequency bands, which the main remote devices 30*m* and 40 and the sub-remote devices 30*s* and 40*s* receive from user terminals. Each of the first to nth base station interface unit s 11_1 to 11_*n* may extract, from the plurality of combined uplink transmission signals, an uplink RF signal corresponding to a previously set frequency band (e.g., a frequency band of the input downlink RF signal).

Each of the first to nth base station interface unit s 11_1 to 11_*n* may adjust power of the extracted uplink RF signal and output the uplink RF signal with the adjusted power to the corresponding base station. For example, each of the first to nth base station interface unit s 11_1 to 11_*n* may increase the power of the extracted uplink RF signal and output the uplink RF signal with the increased power to the corresponding base station.

The headend combining/distributing unit 12 may combine downlink RF signals output from the first to nth base station interface units 11_1 to 11_*n*. Hereinafter, the combined downlink RF signals are referred to as downlink transmission signals. The headend combining/distributing unit 12 may distribute the downlink transmission signals to the first to mth headend optical transceiving units 13_1 to 13_*m*.

The headend combining/distributing unit 12 may combine the uplink transmission signals output from the first to mth headend optical transceiving units 13_1 to 13_*m*. The headend combining/distributing unit 12 may distribute the plurality of combined uplink transmission signals to the first to nth base station interface unit s 11_1 to 11_*n*.

According to an implementation example, the headend combining/distributing unit 12 may generate the downlink transmission signal by combining, together with the downlink RF signals, for example, an extension control signal, a remote control signal, a status information request signal, a delay measurement signal, etc., transmitted from the headend control unit 14. Here, the extension control signal may be a signal for controlling the extension device 20, and the remote control signal may be a signal for controlling the main remote device 30*m* or 40*m* or the sub-remote device 30*s* or 40*s*. The status information request signal may be a signal for requesting the extension device 20, the main remote device 30*m* or 40*m*, or the sub-remote device 30*s* or 40*s* of information on downlink power, uplink power, the occurrence of abnormality, etc. The delay measurement signal may be a signal for measuring a delay between the headend device 10 and the extension device 20, between the headend device 10 and the main remote device 30*m* or 40*m*, or between the headend device 10 and the sub-remote device 30*s* or 40*s*.

Alternatively, the headend combining/distributing unit 12 may separate, from the uplink transmission signals, a status information signal, a delay response signal, etc., transmitted from the extension device 20, the main remote device 30*m* or 40*m*, or the sub-remote device 30*s* or 40*s*, and transmit, to the headend control unit 14, the separated status information signal, delay response signal, etc. Here, the status information signal and the delay response signal may be signals that the extension device 20, the main remote device 30*m* or 40*m*, or the sub-remote device 30*s* or 40*s* transmits in response to the status information request signal and the delay measurement signal.

The headend combining/distributing unit 12, for example, may include a signal conversion device such as a modem. The headend combining/distributing unit 12 may process the above-described predetermined control signal and the like to be combined with the downlink RF signals through the signal conversion device and transmitted to the extension device 20, the main remote device 30*m* or 40*m*, or the sub-remote device 30*s* or 40*s*. The headend combining/distributing unit 12 may process the status information signal and the like, transmitted from the extension device 20, the main remote device 30*m* or 40*m*, or the sub-remote device 30*s* or 40*s*, to be used by the headend control unit 14.

Each of the first to mth headend optical transceiving units 13_1 to 13_*m* may generate a downlink optical signal by electrical-to-optical converting the input downlink transmission signal. Each of the first to mth headend optical transceiving units 13_1 to 13_*m* may transmit the generated downlink optical signal to the extension device 20 or the main remote device 30*m* through a corresponding optical transport medium.

Each of the first to mth headend optical transceiving units 13_1 to 13_*m* may receive an uplink optical signal from the extension device 20 or the main remote device 30*m* through a corresponding optical transport medium. Each of the first to mth headend optical transceiving units 13_1 to 13_*m* may optical-to-electrical convert the input uplink optical signal to be restored as an uplink transmission signal. Each of the first to mth headend optical transceiving units 13_1 to 13_*m* may output the restored uplink transmission signal to the headend combining/distributing unit 12.

According to an implementation example, at least one of the first to mth headend optical transceiving units 13_1 to 13_*m*, for example, may generate the downlink optical signal by electrical-to-optical converting the extension control signal, the remote control signal, the status information request signal, the delay measurement signal, etc., transmitted from the headend control unit 14, together with the input downlink transmission signal.

Alternatively, at least one of the first to mth headend optical transceiving units 13_1 to 13_*m* may optical-to-electrical convert the input uplink optical signal and then separate, from the converted uplink optical signal, the status information signal, the delay response signal, etc., transmitted from the extension device 20, the main remote device 30*m* or 40*m*, or the sub-remote device 30*s* or 40*s*. The separated status information signal, delay response signal, etc. may be transmitted to the headend control unit 14.

At least one of the first to mth headend optical transceiving units 13_1 to 13_*m*, for example, may include a signal conversion device such as a modem. The at least one of the first to mth headend optical transceiving units 13_1 to 13_*m* may process the above-described predetermined control signal and the like to be electrical-to-optical converted together with the downlink transmission signal by using the signal conversion device and transmitted to the extension device 20, the main remote device 30*m* or 40*m*, or the sub-remote device 30*s* or 40*s*. The at least one of the first to mth headend optical transceiving units 13_1 to 13_*m* may process the status information signal and the like, transmitted from the extension device 20, the main remote device 30*m* or 40*m*, or the sub-remote device 30*s* or 40*s*, to be used by the headend control unit 14.

The headend control unit 14 may control and/or monitor at least one of the first to nth base station interface units 11_1 to 11_*n* and the first to mth headend optical transceiving units 13_1 to 13_*m*.

The headend control unit 14 may receive a headend control signal from an external device, e.g., an NMS, a manager's terminal, etc., communicatively connected thereto through a network, and control and/or monitor at least one of the first to nth base station interface unit s 11_1 to 11_*n* and the first to mth headend optical transceiving units 13_1 to 13_*m* in response to the headend control signal. Here, an Ethernet link or the like, for example, may be used as the link between headend control unit 14 and the external device. However, the inventive concept is not limited thereto, and any type of link may be used as the link between headend control unit 14 and the external device.

The headend control unit 14 may generate a status information signal on at least one of the first to nth base station interface unit s 11_1 to 11_n and the first to mth headend optical transceiving units 13_1 to 13_m, and transmit the generated status information signal to the external device.

The headend control unit 14 may transmit, to the headend combining/distributing unit 12 or the firs to mth headend optical transceiving units 13_1 to 13_m, predetermined signals generated by the headend control unit 14 or transmitted from the external device, e.g., the above-described extension control signal, remote control signal, status information request signal, delay measurement signal, etc., so that the predetermined signals are transmitted to the extension device 20, the main remote device 30m or 40, or the sub-remote device 30s or 40s.

The headend control unit 14 may receive a status information signal, a delay response signal, etc. of the extension device 20, the main remote device 30m or 40, or the sub-remote device 30s or 40s, transmitted from the headend combining/distributing unit 12 or the firs to mth headend optical transceiving units 13_1 to 13_m. The headend control unit 14 may perform status analysis, delay measurement, etc. of a corresponding device, based on the transmitted signals. The headend control unit 14 may transmit, to the external device, the status information signal, etc., transmitted from the extension device 20, the main remote device 30m or 40, or the sub-remote device 30s or 40s, through the above-described Ethernet link, etc.

The headend control unit 14, for example, may include a signal conversion device such as a modem, and perform processing such that a corresponding component or the headend control unit 14 can use the above-described control signal, etc. through the signal conversion device.

The headend control unit 14 may monitor frequency spectra of input and/or output signals with respect to at least one of the first to nth base station interface unit s 11_1 to 11_n, the headend combining/distributing unit 12, and the first to mth headend optical transceiving units 13_1 to 13_m. In this case, the headend control unit 14 may be provided with a component for spectrum analysis. However, it will be apparent that the component for spectrum analysis may be implemented separately from the headend control unit 14. The headend control unit 14 controls power of downlink RF signals input to the first to nth base station interface unit s 11_1 to 11_n, based on a result obtained by monitoring frequency spectra of the downlink RF signals, so that limited resources between the headend device 10 and the main remote device 30m can be impartially distributed to the downlink RF signals.

Figure 3:
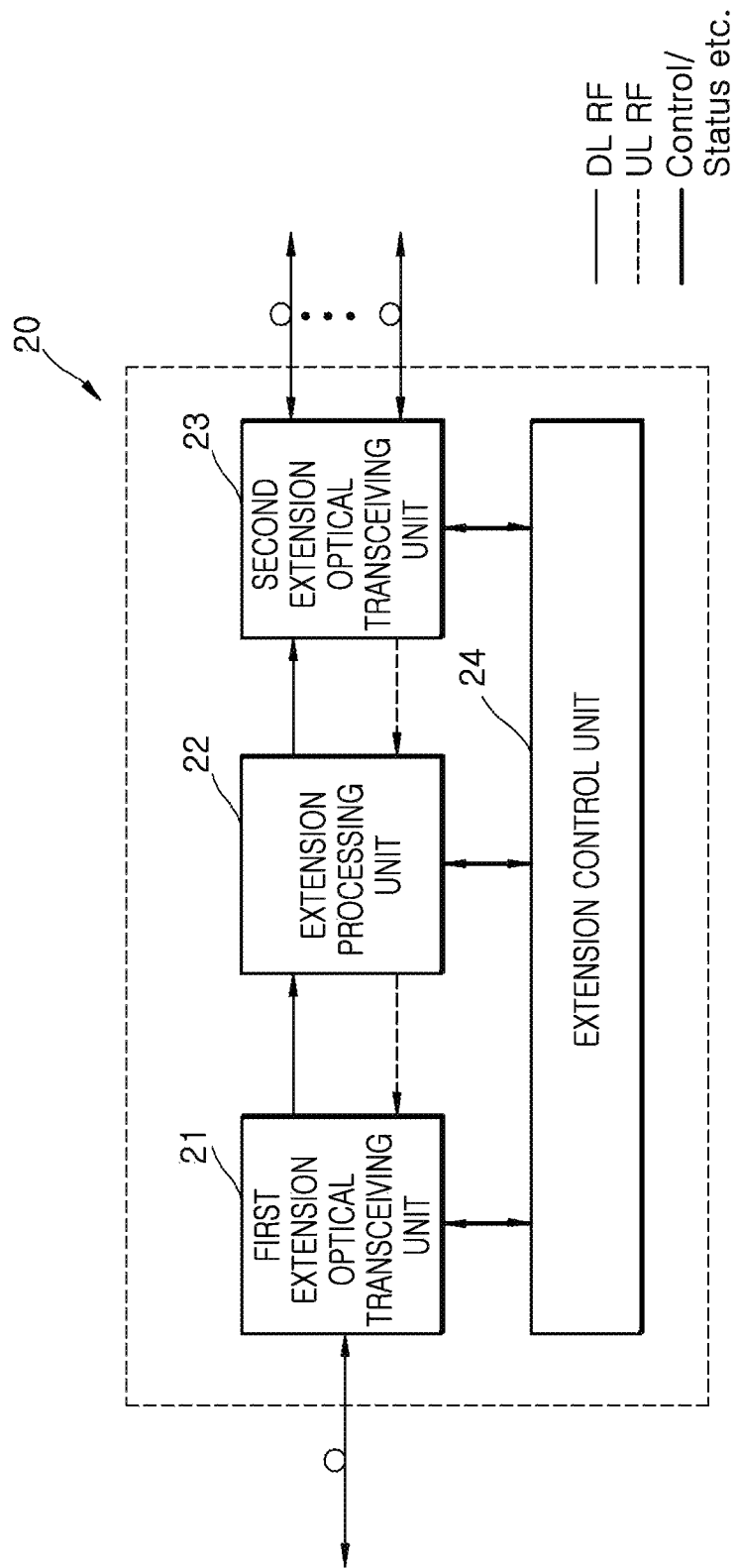
FIG. 3 is a diagram schematically showing some components of an extension device according to an embodiment of the inventive concept.

FIG. 3 is a diagram schematically showing some components of an extension device according to an embodiment of the inventive concept. For convenience of illustration, the embodiment of the inventive concept will be described with reference FIG. 3 together with FIG. 1.

Referring to FIG. 3, the extension 20 may include a first extension optical transceiving unit 21, an extension processing unit 22, a second extension optical transceiving unit 23, and an extension control unit 24.

The first extension optical transceiving unit 21 may receive a downlink optical signal from the headend device 10. The first extension optical transceiving unit 21 may electrical-to-optical convert the input downlink optical signal to be restored as a downlink transmission signal generated by the headend device 10, and output the restored downlink transmission signal to the extension processing unit 22.

The first extension optical transceiving unit 21 may electrical-to-optical convert, into an uplink optical signal, a predetermined uplink transmission signal that is generated by the main remote device 40m connected to the extension device 20 and signal-processed by the extension processing unit 22, and transmit the converted uplink optical signal to the headend device 10.

According to an implementation example, the first extension optical transceiving unit 21 may separate an extension control signal, a status information request signal, a delay measurement signal, etc. from the downlink transmission signal to be transmitted to the extension control unit 24. Alternatively, the first extension optical transceiving unit 21 may allow a status information signal, a delay response signal, etc. of the extension device 20, transmitted from the extension control unit 24, to be included in the uplink transmission signal.

The first extension optical transceiving unit 24, for example, may include a signal conversion device such as a modem, and process the control signal, etc. by using the signal conversion device.

The extension processing unit 22 may perform signal processing, such as amplification, on the input downlink transmission signal, and output the signal-processed downlink transmission signal to the second extension optical transceiving unit 22. The extension processing unit 22 may perform signal processing, such as amplification, on the input uplink transmission signal, and output the signal-processed uplink transmission signal to the first extension optical transceiving unit 21. When the headend device 10 and the main remote device 40m are connected through the extension device 20, the transmission path of signals is lengthened as compared with when the headend device 10 and the main remote device 30m are directly connected to each other, and hence the extension processing unit 22 re-amplifies downlink and uplink transmission signals to have a predetermined level so as to ensure service quality, etc.

According to an implementation example, the extension processing unit 22 may separate the extension control signal, the status information request signal, the delay measurement signal, etc. from the downlink transmission signal to be transmitted to the extension control unit 24, or allow a delay measurement signal, etc. of the main remote device 40m or the sub-remote device 40s, transmitted from the extension control unit 24, to be included in the downlink transmission signal.

Alternatively, the extension processing unit 22 may separate, from the uplink transmission signal, a delay response signal, etc., transmitted from the main remote device 40m or the sub-remote device 40s, to be transmitted to the extension control unit 24, or allow a state information signal, a delay response signal, etc. of the extension device 20, transmitted from the extension control unit 24, to be included in the uplink transmission signal.

The extension processing unit 22, for example, may include a signal conversion device such as a modem, and process the control signal, etc. by using the signal conversion device.

The second extension optical transceiving unit 23 may electrical-to-optical convert downlink transmission signal signal-processed by the extension processing unit 22 into a downlink optical signal, and distribute the converted downlink optical signal to the main remote devices 40m.

The second extension optical transceiving unit 23 may combine uplink optical signals transmitted from the main remote devices 40 and then optical-to-electrical convert the combined signal to be restored as an uplink transmission signal. The second extension optical transceiving unit 23 may output the restored uplink transmission signal to the extension processing unit 22.

According to an implementation example, the second extension optical transceiving unit 23 may generate the downlink optical signal by electrical-to-optical converting a delay measurement signal, etc. of the main remote device 40m or the sub-remote device 40s, transmitted from the extension control unit 24, together with the downlink transmission signal signal-processed by the extension processing unit 22. Alternatively, the second extension optical transceiving unit 23 may optical-to-electrical convert the input uplink optical signal and separate the converted uplink optical signal into an uplink transmission signal and a delay response signal, etc. from the main remote device 40m or the sub-remote device 40s. The second extension optical transceiving unit 23 may output the separated uplink transmission signal to the extension processing unit 22, and transmit the separated delay response signal, etc. to the extension control unit 24.

The second extension optical transceiving unit 23, for example, may include a signal conversion device such as a modem, and may process the delay measurement signal, etc. by using the signal conversion device.

Meanwhile, in FIG. 3, it is illustrated that the extension device 20 only one second extension optical transceiving unit 23, but the inventive concept is not limited thereto. According to an implementation example, the extension device 20 may include at least two extension optical transceiving units. In this case, the extension processing unit 22 may be configured to distribute an amplified downlink transmission signal to the plurality of second extension optical transceiving units. Alternatively, the extension processing unit 22 may be configured to combine uplink transmission signals transmitted from the plurality of second extension optical transceiving units 23 and then amplify the combined signal.

The extension control unit 24 may identify an extension control signal, a status information request signal, a delay measurement signal, etc., transmitted from the headend device 10 through the first extension optical transceiving unit 21 or the extension processing unit 22, and control internal components or generate a status information signal, a delay response signal, etc., in response to the identified signal. The extension control unit 24 may transmit the generated status information signal, delay response signal, etc. of the extension device 20 to the first extension optical transceiving unit 21 or the extension processing unit 22 such that the status information signal, delay response signal, etc. is transmitted to the headend device 10.

The extension control unit 24 may transmit a delay measurement signal of the main remote device 40m or the sub-remote device 40s to the extension processing unit 22 or the second extension optical transceiving unit 23 such that the delay measurement signal is transmitted to the main remote device 40m or the sub-remote device 40s. The extension control unit 24 may measure a delay between the extension device 20 and the main remote device 40m or between the extension device 20 and the sub-remote device 40s, based on the delay response signal of the main remote device 40m or the sub-remote device 40s, transmitted through the extension processing unit 22 or the second extension optical transceiving unit 23.

The extension control unit 24, for example, may include a signal conversion device such as a modem. The extension control unit 24 may process the control signal, etc. to be used in a corresponding component through the signal conversion device, or used such that the control signal, etc. can be used in the extension control unit 24.

Meanwhile, the extension control unit 24 may be directly connected to an external device such as an NMS connected through a network or a manager's terminal. The extension control unit 24 may control the first and second extension optical transceiving units 21 and 23 and the extension processing unit 22 by receiving an extension control signal, etc., transmitted from the external device. The extension control unit 24 may directly transmit, to the external device, status information signals of the first and second extension optical transceiving units 21 and 23 and the extension processing unit 22.

Figure 4:
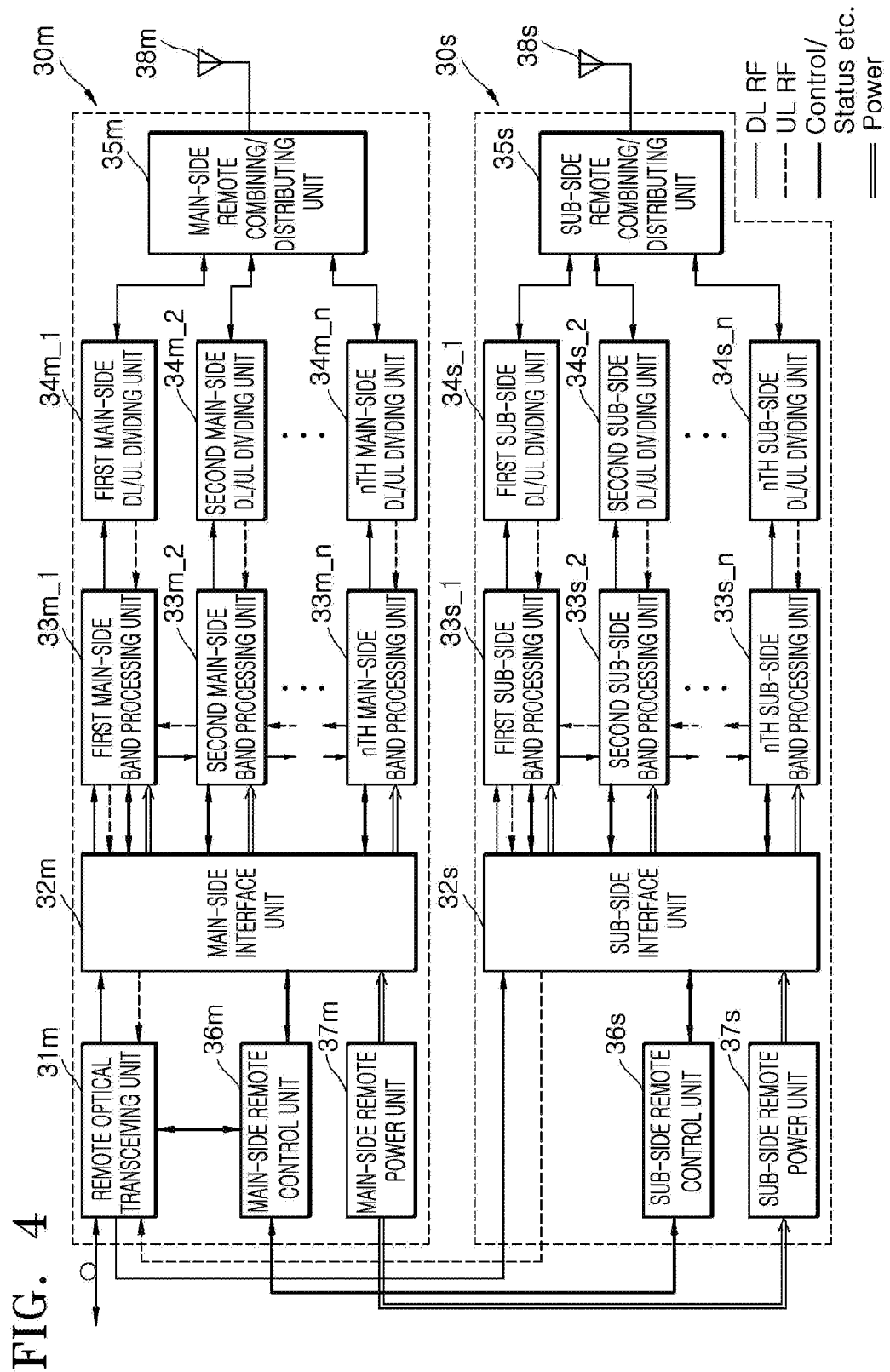
FIG. 4 is a diagram schematically showing some components of a main remote device and a sub-remote device according to an embodiment of the inventive concept.
Figure 5:
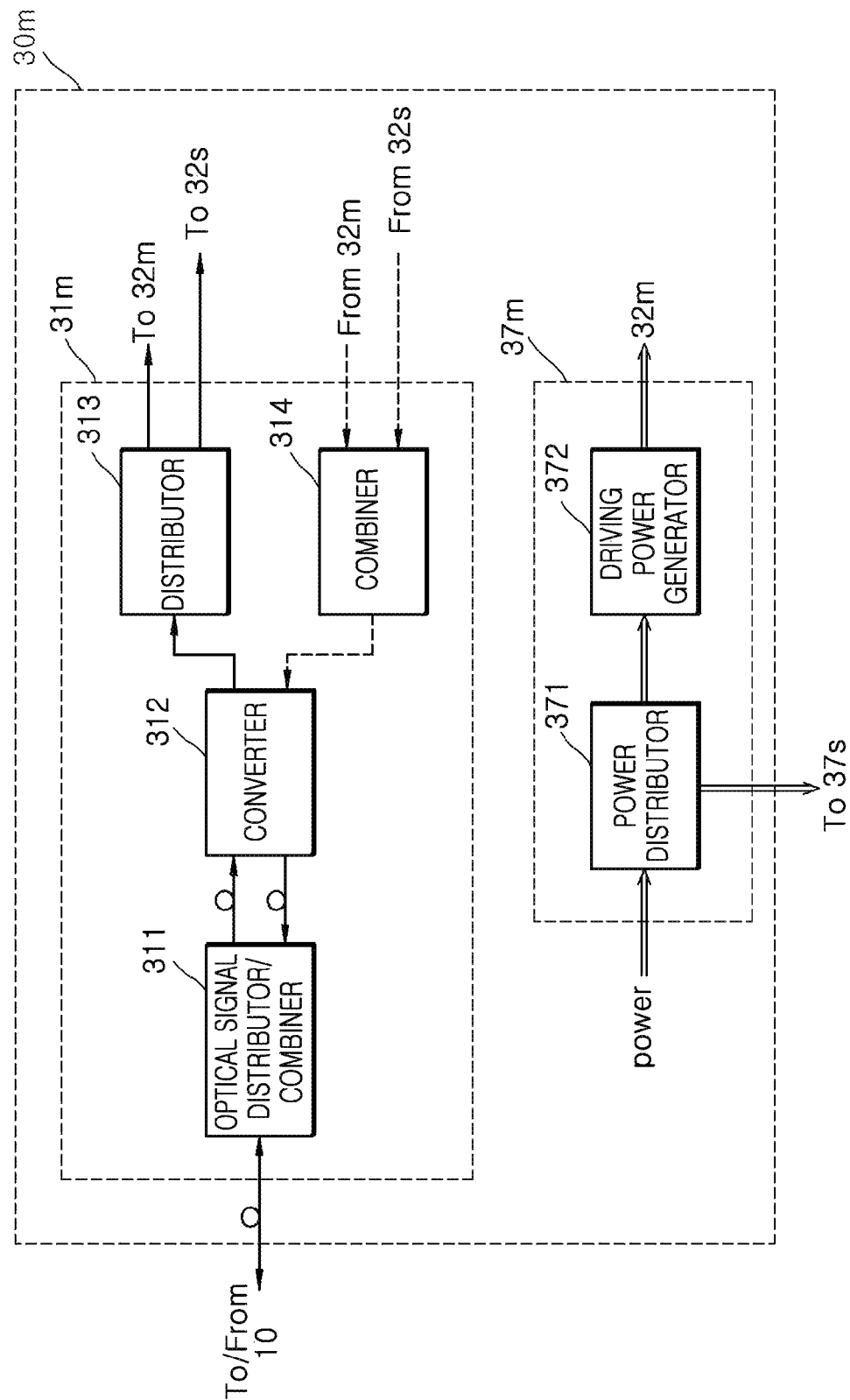
FIG. 5 is an exemplary diagram showing in detail the some components of the main remote device according to the embodiment of the inventive concept.

FIG. 4 is a diagram schematically showing some components of a main remote device and a sub-remote device according to an embodiment of the inventive concept, and FIG. 5 is an exemplary diagram showing in detail the some components of the main remote device according to the embodiment of the inventive concept. In FIGS. 4 and 5, a case where the main remote device 30m and the sub-remote device 40s shown in FIG. 1 are respectively used as the main remote device and the sub-remote device shown in FIGS. 4 and 5 will be described as an example. However, it will be apparent that the main remote device 40m and the sub-remote device 40s shown in FIG. 1 may respectively correspond to the main remote device and the sub-remote device shown in FIGS. 4 and 5. In FIGS. 4 and 5, for convenience of illustration, the embodiment of the inventive concept will be described with reference to FIGS. 4 and 5 together with FIG. 1, and descriptions overlapping with those of FIG. 1 will be omitted.

Referring to FIG. 4, the main remote device 30m may include a remote optical transceiving unit 31m, a main-side interface unit 32m, first to nth main-side band processing units 33m_1 to 33m_n, first to nth downlink (DL)/uplink (UL) main-side dividing units 34m_1 to 34m_n, a main-side remote combining/distributing unit 35m, a main-side remote control unit 36m, a main-side remote power unit 37m, and a main-side antenna 38m.

First, the remote optical transceiving unit 31m will be described with further reference to FIG. 5. The remote optical transceiving unit 31m may include an optical signal distributor/combiner 311, a converter 312, a distributor 313, and a combiner 314. According to an implementation example, at least one of the optical signal distributor/combiner 311, the converter 312, the distributor 313, and the combiner 314 may be implemented in a modular structure, and the remote optical transceiving unit 31m may also be implemented in a modular structure.

The optical signal distributor/combiner 311 may receive a downlink optical signal from the headend device 10, and transmit the received downlink optical signal to the converter 312. The optical signal distributor/combiner 311 may receive an uplink optical signal transmitted from the converter 312 and transmit the received uplink optical signal to the headend device 10. The optical signal distributor/combiner 311, for example, may be configured as a WDM element.

The converter 312 may convert the downlink optical signal into a downlink transmission signal, and transmit the downlink transmission signal to the distributor 313. The converter 312 may electrical-to-optical convert an uplink transmission signal transmitted from the combiner 314 into the uplink optical signal, and transmit the uplink transmission signal to the optical signal distributor/combiner 311. Here, the uplink transmission signal may include at least one of a main uplink transmission signal transmitted from the main-side interface unit 32m of the main remote device 30 and a sub-uplink transmission signal transmitted from a sub-side interface unit 32s of the sub-remote device 30s.

The distributor 313 may distribute the downlink transmission signal to the main-side interface unit 32m of the main remote device 30m and the sub-side interface unit 32s of the sub-remote device 30s. If the connection between the main remote device 30m and the sub-remote device 30s is released, the distributor 313 may transmit the downlink transmission signal to only the main-side interface unit 32m of the main remote device 30m.

The combiner 314 may generate the uplink transmission signal by combining the main uplink transmission signal and the sub-uplink transmission signal, and transmit the generated uplink transmission signal to the converter 312. If the connection between the main remote device 30m and the sub-remote device 30s is released, the combiner 314 may generate the uplink transmission signal, based on the main uplink transmission signal, and transmit the generated uplink transmission signal to the converter 312.

Meanwhile, although not shown in FIG. 5, a signal processing unit for extracting a remote control signal, etc. may be disposed between a front end of the converter 312 and a front end of the distributor 313 and the combiner 314. The signal processing unit may separate, from the downlink transmission signal, a remote control signal, a status information request signal, etc. of the main remote device 30m or the sub-remote device 30s, and transmit the separated signals to the main-side remote control unit 36m. Also, the signal processing unit may transmit, to the converter 312, a status information signal, etc. of the main remote device 30m or the sub-remote device 30s, transmitted from the main-side remote control unit 36m, together with the uplink transmission signal. The signal processing unit, for example, may include a signal conversion device such as a modem.

Referring back to FIG. 4, the main-side interface unit 32m may output a downlink transmission signal transmitted from the remote optical transceiving unit 31m along a previously set downlink path.

The downlink path may be set such that the down link transmission signal is transmitted to a band processing unit at the frontmost end, based on a connection state between the main-side interface unit 32m and the first to nth main-side band processing units 33m_1 to 33m_n. For example, when the main-side interface unit 32m and the first to nth main-side band processing units 33m_1 to 33m_n are all connected to each other, the downlink path may be set such that the downlink transmission signal is transmitted to the first main-side band processing unit 33m_1 that is a band processing unit at the frontmost end.

The downlink path may be reset as the connection state between the main-side interface unit 32m and the first to nth main-side band processing units 33m_1 to 33m_n is changed. For example, if the connection between the main-side interface unit 32m and the first main-side band processing unit 33m-1 is released, and the connection between the main-side interface unit 32m and the second and third main-side band processing units 33m_2 and 33m_3 is maintained, the downlink path may be reset such that the downlink transmission signal is transmitted to the second main-side band processing unit 33m_2 that is a band processing unit at the frontmost end in a current state.

The main-side interface unit 32m may output the input uplink transmission signal along a previously set uplink path.

The uplink path may be set and reset corresponding to the above-described downlink path. For example, when the main-side interface unit 32m and the first to nth main-side band processing units 33m_1 to 33m_n are all connected to each other, the uplink path may be set such that the main-side interface unit 32m receives an uplink transmission signal from the first main-side band processing unit 33m_1 that is a band processing unit at the frontmost end and transmits the received uplink transmission signal to the remote optical transceiving unit 31m. Also, if the connection between the main-side interface unit 32m and the first main-side band processing unit 33m_1 is released, and the connection between the main-side interface unit 32m and the second and third main-side band processing units 33m_2 and 33m_3 is maintained, the uplink path may be reset such that the main-side interface unit 32m receives an uplink transmission signal from the second main-side band processing unit 33m_2 that is a band processing unit at the frontmost end in a current state and transmits the received uplink transmission signal to the remote optical transceiving unit 31m.

The main-side interface unit 32m is communicatively connected to the remote optical transceiving unit 31m, the first to nth main-side band processing units 33m_1 to 33m_n, the main-side remote control unit 36m, and the main-side remote power unit 37m, and may be implemented as an interface unit board to enable signals, etc. to be transmitted/received between the remote optical transceiving unit 31m, the first to nth main-side band processing units 33m_1 to 33m_n, the main-side remote control unit 36m, and the main-side remote power unit 37m.

The first to nth main-side band processing units 33m_1 to 33m_n may be connected to each other in a cascade structure such that a downlink transmission signal output from the main-side interface unit 32m is transmitted from the front end to the rear end, and an uplink RF signal is accumulatively transmitted from the rear end to the front end.

A case where the first to third main-side band processing units 33m_1 to 33m_3 are connected in the cascade structure will be described as an example. In downlink, the first main-side band processing unit 33m_1 transmits, to the second main-side band processing unit 33m_2, a downlink transmission signal from the main-side interface unit 32m, and the second main-side band processing unit 33m_2 again transmits, to the third main-side band processing unit 33m_3, the downlink transmission signal transmitted from the first main-side band processing unit 33m_1. In uplink, the third main-side band processing unit 33m_3 transmits its own uplink RF signal to the second main-side band processing unit 33m_2, and the second main-side band processing unit 33m_2 combines its own uplink RF signal and the uplink RF signal of the third main-side band processing unit 33m_3 and then transmits the combined uplink RF signal to the first main-side band processing unit 33m_1. The first main-side band processing unit 33m_1 combines its own uplink RF signal and the combined uplink RF signal of the second and third main-side band processing units 33m_2 and 33m_3 and then output the combined uplink RF signal as a main uplink transmission signal to the main-side interface unit 32m.

Each of the first to nth main-side band processing units 33m_1 to 33m_n may perform various signal processes, such as amplification, on a downlink RF signal in a corresponding frequency band among a plurality of downlink RF signals in different frequency bands, which are included in the input downlink transmission signal. Each of the first to nth main-side band processing units 33$m$_1 to 33$m$_n may output the signal processed downlink RF signal to a corresponding main-side DL/UL dividing unit among the first to nth main-side DL/UL dividing units 34$m$_1 to 34$m$_n.

Each of the first to nth main-side band processing units 33$m$_1 to 33$m$_n may perform signal processing, such as amplification, on the uplink RF signal transmitted from the corresponding main-side DL/UL dividing unit among the first to nth main-side DL/UL dividing units 34$m$_1 to 34$m$_n. Each of the first to nth main-side band processing units 33$m$_1 to 33$m$_n may combine its own processed uplink RF signal and the signal-processed uplink RF signal transmitted from the rear end thereof, and transmit the combined uplink RF signal to the main-side band processing unit at the front end. In this case, the main-side band processing unit at the rearmost end may transmit only its own processed uplink RF signal to the main-side band processing unit at the rear end thereof, and the main-side band processing unit at the frontmost end may combine its own processing uplink RF signal and the combined uplink RF signals transmitted from the main-side band processing unit at the rear end thereof and output the combined uplink RF signal as a main uplink transmission signal to the main-side interface unit 32$m$.

Each of the first to nth main-side band processing units 33$m$_1 to 33$m$_n may be implemented in a modular structure, and at least one of internal components of each of the first to nth main-side band processing units 33$m$_1 to 33$m$_n may also be implemented in a modular structure. Detailed configurations of the first to nth main-side band processing units 33$m$_1 to 33$m$_n will be described in detail below with reference to FIGS. 7 to 10.

Each of the first to nth main-side DL/UL dividing units 34$m$_1 to 34$m$_n may be connected to a corresponding main-side band processing unit among the first to nth main-side band processing units 33$m$_1 to 33$m$_n. According to an implementation example, each of the first to nth main-side DL/UL dividing units 34$m$_1 to 34$m$_n may be implemented in a modular structure. In this case, each of the first to nth main-side DL/UL dividing units 34$m$_1 to 34$m$_n may be implemented, as an integrated module, with the corresponding main-side band processing unit among the first to nth main-side band processing units 33$m$_1 to 33$m$_n, or implemented as a module separated from the corresponding main-side band processing unit among the first to nth main-side band processing units 33$m$_1 to 33$m$_n.

Each of the first to nth main-side DL/UL dividing units 34$m$_1 to 34$m$_n may receive a downlink RF signal from the main-side band processing unit connected thereto. Each of the first to nth main-side DL/UL dividing units 34$m$_1 to 34$m$_n may remove noise, etc. from the input downlink RF signal and transmit, to the main-side remote combining/distributing unit 35$m$, the downlink RF signal from which the noise, etc. is removed.

Each of the first to nth main-side DL/UL dividing units 34$m$_1 to 34$m$_n may extract an uplink RF signal in a frequency band required in the main-side band processing unit connected thereto from the uplink RF signal transmitted from the main-side remote combining/distributing unit 35$m$, and transmit the extracted uplink RF signal to the main-side band processing unit connected thereto.

Each of the first to nth main-side DL/UL dividing units 34$m$_1 to 34$m$_n, for example, may be implemented as a duplexer.

The main-side remote combining/distributing unit 35$m$ may transmit, the main-side antenna 38$m$, downlink RF signals output from the first to nth main-side DL/UL dividing units 34$m$_1 to 34$m$_n such that the downlink RF signals are transmitted to a user terminal. The main-side remote combining/distributing unit 35$m$ may distribute an uplink signal of the user terminal, received through the main-side antenna 38$m$, to the first to nth main-side DL/UL dividing units 34$m$_1 to 34$m$_n.

The main-side remote control unit 36$m$ may control the remote optical transceiving unit 31$m$ and the first to nth main-side band processing units 33$m$_1 to 33$m$_n. For example, the main-side remote control unit 36$m$ may generate first to nth control signals for controlling the first to nth main-side band processing units 33$m$_1 to 33$m$_n, and output the generated first to nth control signals to the main-side interface unit 32$m$. In this case, the main-side interface unit 32$m$ may transmit the input first to nth control signals to a corresponding main-side band processing unit among the first to nth main-side band processing units 33$m$_1 to 33$m$_n.

According to an implementation example, the main-side remote control unit 36$m$ may generate the first to nth control signals, based on a remote control signal of the main remote device 30$m$, transmitted from the headend device 10, to control the remote optical transceiving unit 31$m$ and the first to nth main-side band processing units 33$m$_1 to 33$m$_n. Alternatively, the main-side remote control unit 36$m$ may control the remote optical transceiving unit 31$m$ and the first to nth main-side band processing units 33$m$_1 to 33$m$_n by directly using the remote control signal of the main remote device 30.

According to another implementation example, the main-side remote control unit 36$m$ may be directly connected to an external device such as an NMS connected through a network or a manager's terminal. The main-side remote control unit 36$m$ may generate the first to nth control signal, based on a remote control signal of the main remote device 30$m$, transmitted from the external device, to control the remote optical transceiving unit 31$m$ and the first to nth main-side band processing units 33$m$_1 to 33$m$_n. Alternatively, the main-side remote control unit 36$m$ may control the remote optical transceiving unit 31$m$ and the first to nth main-side band processing units 33$m$_1 to 33$m$_n by directly using the remote control signal of the main remote device 30$m$, transmitted from the external device.

The main-side remote control unit 36$m$ may transmit, to a sub-side remote control unit 36$s$, a remote control signal of the sub-remote device 30$s$, transmitted from the remote optical transceiving unit 31$m$ or the external device. The main-side remote control unit 36$m$ may transmit, to the remote optical transceiving unit 31$m$, a status information signal, etc., transmitted from the sub-remote device 30$s$.

The main-side remote control unit 36$m$ may monitor operation states of the remote optical transceiving unit 31$m$ and the first to nth main-side band processing units 33$m$_1 to 33$m$_n. Also, the main-side remote control unit 36$m$ may analyze frequency spectra of signals inside the first to nth main-side band processing units 33$m$_1 to 33$m$_n through the following spectrum monitoring part 3336.

The main-side remote control unit 36$m$, for example, may include a signal conversion device such as a modem, and may process a state information request signal, a delay measurement signal, etc., transmitted from the headend device 10, to be used by the main-side remote control unit 36 through the signal conversion device. The main-side remote control unit 36$m$ may generate a state information signal, a delay response signal, etc. in response to the processed status information request signal, delay measurement signal, etc. The main-side remote control unit 36m may process the generated status information signal, delay response signal, etc. and a status information signal, etc., transmitted from the sub-side remote control unit 36s, to be transmitted to the headend device 10 through the remote optical transceiving unit 31m by using the signal conversion device. Meanwhile, the main-side remote control unit 36m may transmit, to the external device, all of the generated status information signal, delay response signal, etc. and the status information signal, etc., transmitted from the sub-side remote control unit 36s.

The main-side remote control unit 36m may be implemented in a modular structure, and at least one of internal components of the main-side remote control unit 36m may also be implemented in a modular structure.

The main-side remote power unit 37m will be described with further reference to FIG. 5. The main-side remote power unit 37m may include a power distributor 371 and a driving power generator 372. According to an implementation example, at least one of the power distributor 371 and the driving power generator 372 may be implemented in a modular structure, and the main-side remote power unit 37 may also be implemented in a modular structure.

The power distributor 371 may distribute power provided from an external power device (not shown) or an internal power supply (not shown) to the driving power generator 372 and a sub-side remote power unit 37s of the sub-remote device 30s.

The driving power generator 372 may generate driving power for driving the first to nth main-side band processing units 33m_1 to 33m_n, based on the power, and output the generated driving power to the main-side interface unit 32m. In this case, the main-side interface unit 32m may transmit the input driving power to each of the first to nth main-side band processing units 33m_1 to 33m_n.

Referring back to FIG. 4, the sub-remote device 30s may include a sub-side interface unit 32s, first to nth sub-side band processing units 33s_1 to 33s_n, first to nth sub-side DL/UL dividing units 34s_1 to 34s_n, a sub-side remote combining/distributing unit 35s, the sub-side remote control unit 36s, the sub-side remote power unit 37s, and a sub-side antenna 38s. In FIG. 4, it is illustrated that the band processing units and the DL/UL dividing units in the sub-remote device 30s are configured to have the same number as the band processing units and the DL/UL dividing units in the main-remote device 30m. However, the inventive concept is not limited thereto, and the number of the band processing units and the DL/UL dividing units in the sub-remote device 30s may be different from the number of the band processing units and the DL/UL dividing units in the main-remote device 30m. The components of the sub-remote device 30s may correspond to the components of the main-remote device 30m, respectively. Hereinafter, in description of each component of the sub-remote device 30s, descriptions overlapping with those of the main-remote device 30m will be omitted, and differences will be mainly described.

The sub-side interface unit 32s may output a downlink transmission signal distributed by the remote optical transceiving unit 31m of the main remote device 30m along a previously set downlink path to transmit the downlink transmission signal to a band processing unit at the frontmost end among the first to nth sub-side band processing units 33s_1 to 33s_n.

The sub-side interface unit 32s may output an input sub-uplink transmission signal to the remote optical transceiving unit 31m of the main remote device 30s along a previously set uplink path.

The first to nth sub-side band processing units 33s_1 to 33s_n may be cascade-connected to each other such that the downlink transmission signal output from the sub-side interface unit 32s is transmitted from the front end to the rear end, and an uplink RF signal is accumulatively transmitted from the rear end to the front end.

Each of the first to nth sub-side band processing units 33s_1 to 33s_n may perform various signal processes on a downlink RF signal in a corresponding frequency band among a plurality of downlink RF signals in different frequency bands, included in the input downlink transmission signal. Each of the first to nth sub-side band processing units 33s_1 to 33s_n may output the signal processed downlink RF signal to a corresponding sub-side DL/UL dividing unit among the first to nth sub-side DL/UL dividing units 34s_1 to 34s_n.

Each of the first to nth sub-side band processing units 33s_1 to 33s_n may perform signal processing, such as amplification, on the uplink RF signal transmitted from the corresponding sub-side DL/UL dividing unit among the first to nth sub-side DL/UL dividing units 34s_1 to 34s_n.

Each of the first to nth sub-side band processing units 33s_1 to 33s_n may combine its own processed uplink RF signal and the signal-processed uplink RF signal transmitted from the rear end thereof and transmit the combined uplink RF signal to a sub-side band processing unit at the front end thereof. In addition, the sub-side band processing unit at the frontmost end may transmit the combined uplink RF signal as the sub-uplink transmission signal to the sub-side interface unit 32s.

Each of the first to nth sub-side band processing units 33s_1 to 33s_n may be implemented in a modular structure, and at least one of internal components of each of the first to nth sub-side band processing units 33s_1 to 33s_n may also be implemented in a modular structure.

Each of the first to nth sub-side DL/UL dividing units 34s_1 to 34s_n may be connected to a corresponding band processing unit among the first to nth sub-side band processing units 33s_1 to 33s_n. According to an implementation example, each of the first to nth sub-side DL/UL dividing units 34s_1 to 34s_n may be implemented in a modular structure. In this case, each of the first to nth sub-side DL/UL dividing units 34s_1 to 34s_n may be implemented, as an integrated module, with the corresponding sub-side band processing unit among the first to nth sub-side band processing units 33s_1 to 33s_n, or implemented as a module separated from the corresponding sub-side band processing unit among the first to nth sub-side band processing units 33s_1 to 33s_n.

Each of the first to nth sub-side DL/UL dividing units 34s_1 to 34s_n may receive a downlink RF signal from the sub-side band processing unit connected thereto. Each of the first to nth sub-side DL/UL dividing units 34s_1 to 34s_n may remove noise, etc. from the input downlink RF signal and transmit, to the sub-side remote combining/distributing unit 35s, the downlink RF signal from which the noise, etc. is removed.

Each of the first to nth sub-side DL/UL dividing units 34s_1 to 34s_n may extract an uplink RF signal in a frequency band required in the sub-side band processing unit connected thereto from the uplink RF signal transmitted from the sub-side remote combining/distributing unit 35s, and transmit the extracted uplink RF signal to the sub-side band processing unit connected thereto.

The sub-side remote combining/distributing unit 35s may transmit, to the sub-side antenna 38s, downlink RF signals output from the first to nth sub-side DL/UL dividing units 34s_1 to 34s_n, to be transmitted to a user terminal. The sub-side remote combining/distributing unit 35s may distribute the uplink signal of the user terminal, received through the sub-side antenna 38s, to the first to nth sub-side DL/UL dividing units 34s_1 to 34s_n.

The sub-side remote control unit 36s may control the first to nth sub-side band processing units 33s_1 to 33s_n. For example, the sub-side remote control unit 36s may generate first to nth control signal for controlling the first to nth sub-side band processing units 33s_1 to 33s_n, and output the generated first to nth control signals to the sub-side interface unit 32s. In this case, the sub-side interface unit 32s may transmit the input first to nth control signal to a corresponding sub-side band processing unit among the first to nth sub-side band processing units 33s_1 to 33s_n.

According to an implementation example, the sub-side remote control unit 36s may control the first to nth sub-side band processing units 33s_1 to 33s_n by generating the first to nth control signals, based on a remote control signal of the sub-remote device 30s, transmitted from the main-side remote control unit 36m. Alternatively, the sub-side remote control unit 36s may control the first to nth sub-side band processing units 33s_1 to 33s_n by directly using the remote control signal of the sub-remote device 30s, transmitted from the main-side remote control unit 36m.

The sub-side remote control unit 36s may generate a status information signal, a delay response signal, etc. in response to a status information request signal, a delay measurement signal, etc. of the sub-remote device 30s, transmitted from the main-side remote control unit 36m. The sub-side remote control unit 36s may transmit the generated status information signal, delay response signal, etc. to the main-side remote control unit 36m.

The sub-side remote control unit 36s may be implemented in a modular structure, and at least one of internal components of the sub-side remote control unit 36s may also be implemented in a modular structure.

The sub-side remote power unit 37s may generate driving power for driving the first to nth sub-side band processing units 33s_1 to 33s_n, based on power distributed by the main-side remote power unit 37m of the main remote device 30m, specifically, the power distributor 371, and output the generated driving power to the sub-side interface unit 32s. In this case, the sub-side interface unit 32s may transmit the input driving power to each of the first to nth sub-side band processing units 33s_1 to 33s_n.

The sub-side remote power unit 37s may be implemented in a modular structure, and at least one of internal components of the sub-side remote power unit 37s may also be implemented in a modular structure.

As described above, in the DAS according to the inventive concept, the main remote device 30m and the sub-remote device 30s are connected in a cascade structure in which the interface unit unit automatically changes the transmission path of signals and transmits a downlink transmission signal between a plurality of band processing units even when the connection state between the plurality of band processing units is changed, and the plurality of band processing units and a plurality of DL/UL dividing units are implemented in a modular structure. Thus, a manager can easily cope with a change in operational environment of the DAS such as a change in service frequency band, the occurrence of service abnormality in a specific frequency band, or the like by replacing only a required band processing unit and a required DL/UL dividing unit. Accordingly, it is possible to improve manager's operational convenience and flexibility and scalability of the DAS.

Also, in the DAS according to the present disclosure, an additional main remote is connected to the headend device, as well as the previously installed main remote device 30m, or the sub-remote device 30s is connected to the main remote device 30m without increasing the spacing distance between the headend device 10 and the main remote device 30m, so that it is possible to ensure a broad coverage and extend coverage. When the main remote device is connected to the headend device 10 or when the spacing distance between the headend device 10 and the main remote device 30m is increased, cost is increased, and resetting of operational environment, etc. is required due to additional equipments, optical lines, etc. On the other hand, the sub-remote device 30s is connected to the main remote device 30m, so that it is possible to minimize the consumption of cost and the change in setting, and the like.

Figure 6:
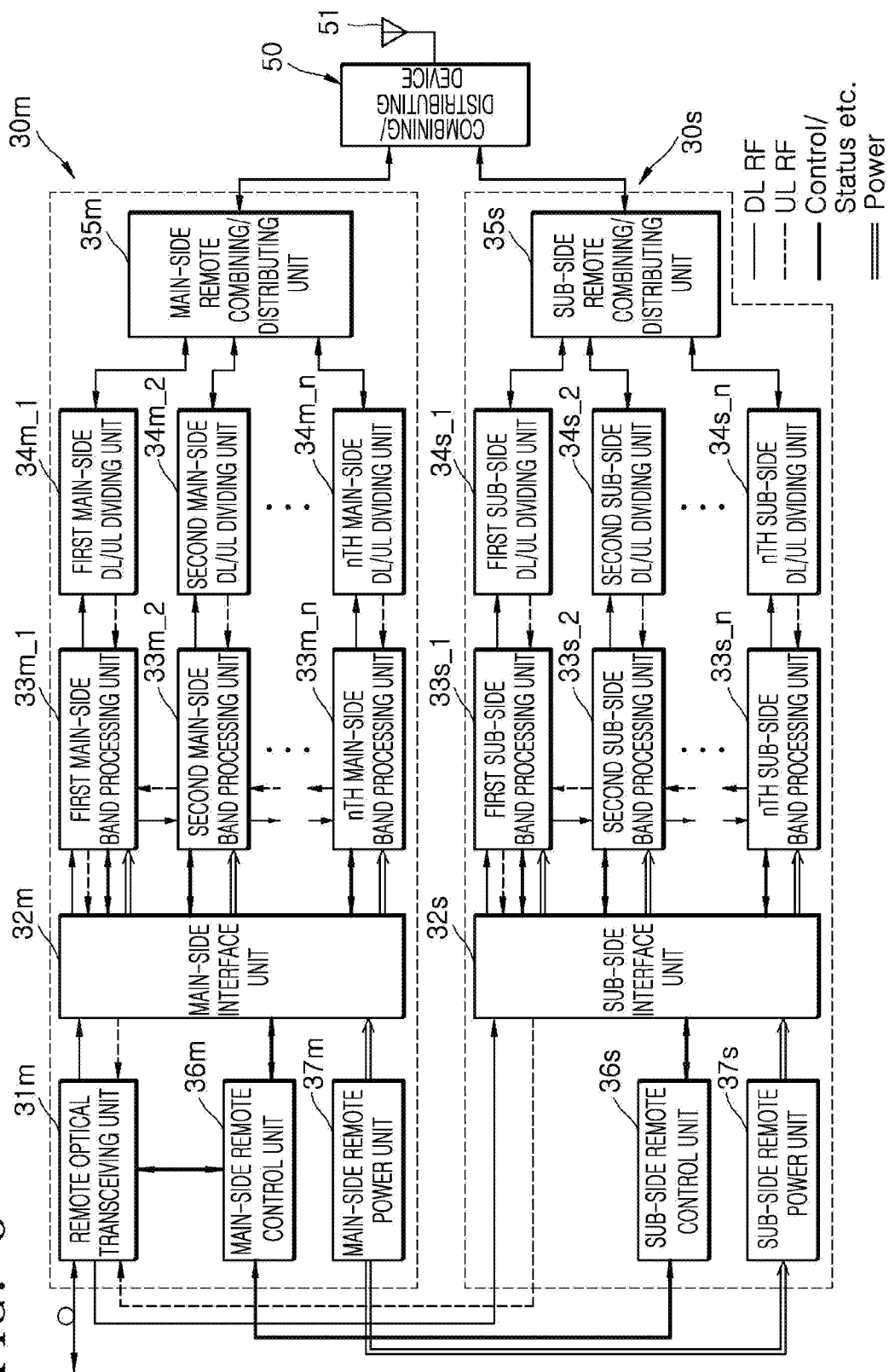
FIG. 6 is a diagram schematically showing some components of a main remote device and a sub-remote device according to another embodiment of the inventive concept.

FIG. 6 is a diagram schematically showing some components of a main remote device and a sub-remote device according to another embodiment of the inventive concept. The main remote device and the sub-remote device, shown in FIG. 6, are modifications of the main remote device and the sub-remote device, shown in FIG. 4. Therefore, it will be apparent that the remote device 40m and the sub-remote device 40s, shown in FIG. 1, may correspond to the main remote device and the sub-remote device, shown in FIG. 6. For convenience of illustration, the embodiment of the inventive concept will be described with reference to FIG. 6 together with FIG. 4. In description of FIG. 6, descriptions overlapping with those of FIG. 4 will be omitted, and differences will be mainly described.

Referring to FIG. 6, unlike FIG. 4, each of the main remote device 30m and the sub-remote device 30s is not directly connected to the corresponding antenna, but may be connected to an antenna 51 connected to a combining/distributing device 50 through the combining/distributing device 50. Here, the combining/distributing device 50 may be implemented as a device separated from the main-remote device 30m and the sub-remote device 30s, and connected to the main remote device 30m and the sub-remote device 30s through a predetermined transport medium, e.g., an RF cable. However, the inventive concept is not limited thereto, and the combining/distributing device 50 may be integrally implemented with any one of the main remote device 30m and the sub-remote device 30s. Meanwhile, in FIG. 6, it is illustrated that the combining/distributing device 50 is connected to the antenna 51. However, the inventive concept is not limited thereto, and the combining/distributing device 50 may be connected to a plurality of antennas.

The combining/distributing device 50 may combine amplified downlink RF signals output from the first to nth main-side band processing units 33m_1 to 33m_n of the main remote device 30m and amplified downlink RF signals output from the first to nth sub-side band processing units 33s_1 to 33s_n of the sub-remote device 30s. The combining/distributing device 50 may transmit the combined downlink RF signals to the antenna 51, and accordingly, the combined downlink RF signals can be transmitted to a user terminal through the antenna 51.

The combining/distributing 50 may distribute an uplink signal of the user terminal, received through the antenna 51, to the main-side remote combining/distributing unit 35m and the sub-side remote combining/distributing unit 35s.

Figure 12:
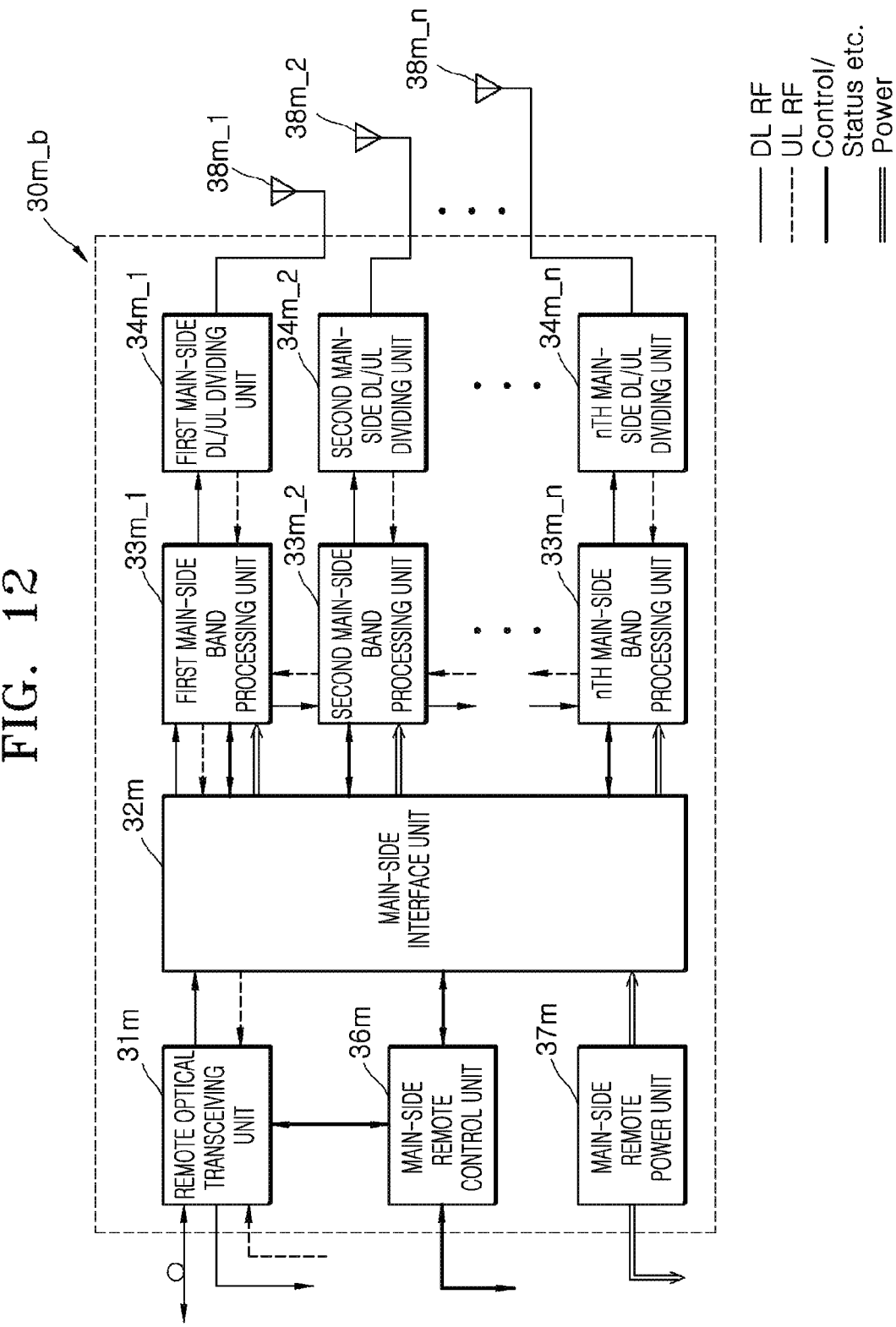
Figure 13:
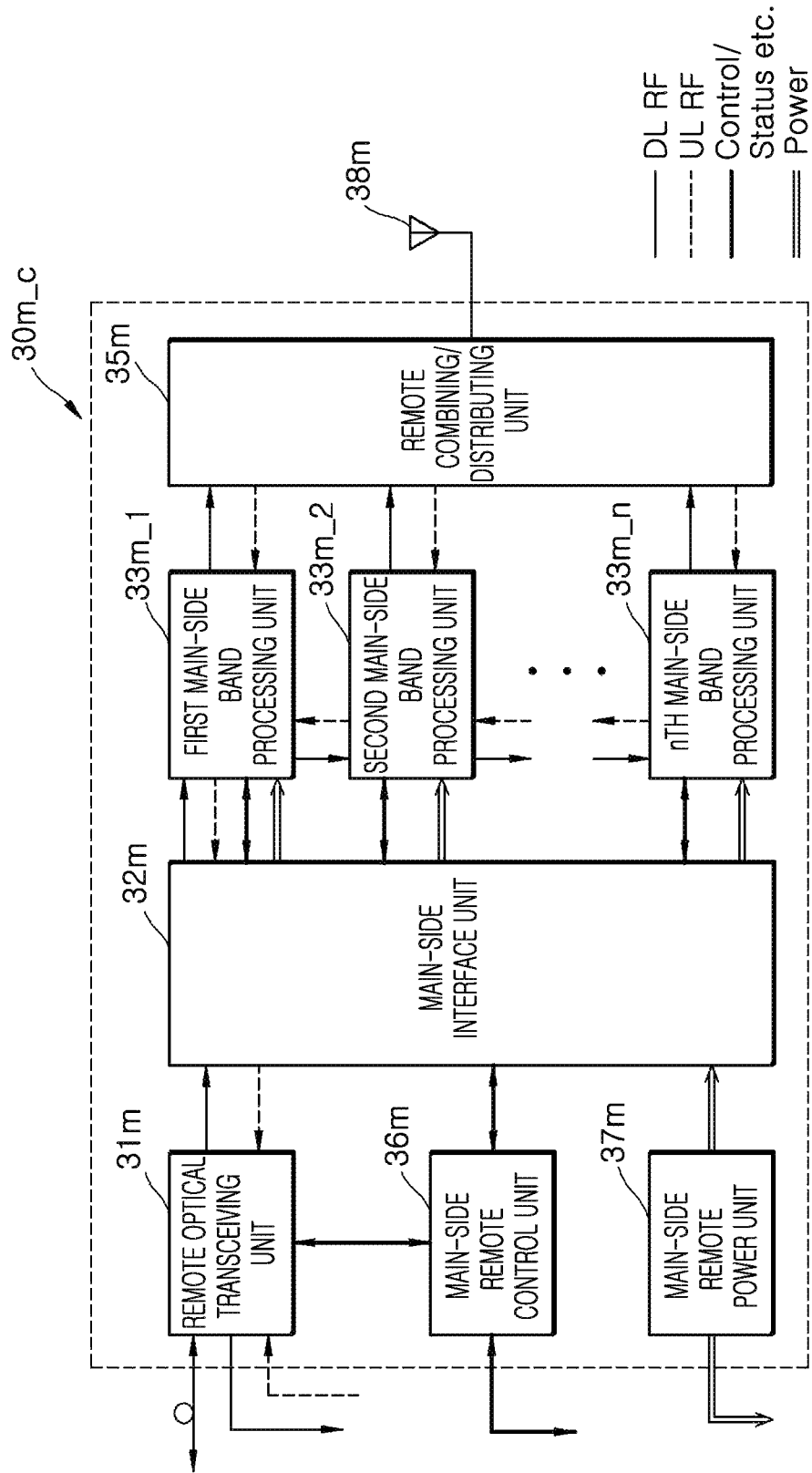

As such, the main remote device 30*m* and the sub-remote device 30*s* can be configured to use a common antenna through the combining/distributing device 50 according to an operational environment. Meanwhile, although not shown in FIG. 6, the main remote device 30*m* and/or the sub-remote device 30*s* may be configured to use a common antenna by being connected to the combining/distributing device 50 in a state in which any one of the DL/UL dividing unit and the remote combining/distributing unit is omitted as shown in FIGS. 12 and 13 which will be described later.

FIGS. 7 to 10 are exemplary diagrams showing in detail some components of band processing units according to embodiments of the inventive concept. In FIGS. 7 to 10, only the first to nth main-side band processing units 33*m*_1 to 33*m*_n of the main remote device 30*m* are illustrated, but the first to nth sub-side band processing units 33*s*_1 to 33*s*_n of the sub-remote device 30*s* may also have a configuration corresponding to the first to nth main-side band processing units 33*m*_1 to 33*m*_n of the main remote device 30*m* shown in any one of FIGS. 7 to 10. In FIGS. 7 to 10, it is illustrated that the first to nth main-side band processing units 33*m*_1 to 33*m*_n have configurations corresponding to each other. However, the inventive concept is not limited thereto, and at least two of the first to nth main-side band processing units 33*m*_1 to 33*m*_n may have different configurations. Hereinafter, for convenience of illustration, the case where the first to nth main-side band processing units 33*m*_1 to 33*m*_n have the same configuration will be described as an example, and the first main-side band processing unit 33_1 will be mainly described. Hereinafter, the embodiments of the inventive concept will be described with reference to FIGS. 7 to 10 together with FIG. 4. In description of FIGS. 7 to 10, descriptions overlapping with those of FIG. 4 will be omitted, and differences will be mainly described.

First, an embodiment of the first main-side band processing unit 33*m*_1 will be described with reference to FIGS. 7 and 8. The first main-side band processing unit 33*m*_1 may include an RF processing unit 331*m*_1 and a digital processing unit 333*m*_1. Here, the RF processing unit 331*m*_1 and/or the digital processing unit 333*m*_1 may be implemented in a modular structure.

The RF processing unit 331*m*_1 may include a distribution part 3311, an extraction/conversion part 3312, a DL amplification part 3313, a UL amplification part 3314, and a combination part 3315.

The distribution part 3311 may distribute a downlink transmission signal output from the main-side interface unit 32*m* to the extraction/conversion part 3312 and a band processing unit at the rear thereof, more specifically a distribution part of the second main-side band processing unit 33*m*_2. According to an implementation example, when the connection between the first main-side band processing unit 33*m*_1 and the second main-side band processing unit 33*m*_2 is released, and the first main-side band processing unit 33*m*_1 and the third main-side band processing unit 33*m*_3 are connected, the distribution part 3311 may transmit the downlink transmission signal to the extraction/conversion part 3312 and a distribution part of the third main-side band processing unit 33*m*_3.

Figure 7:
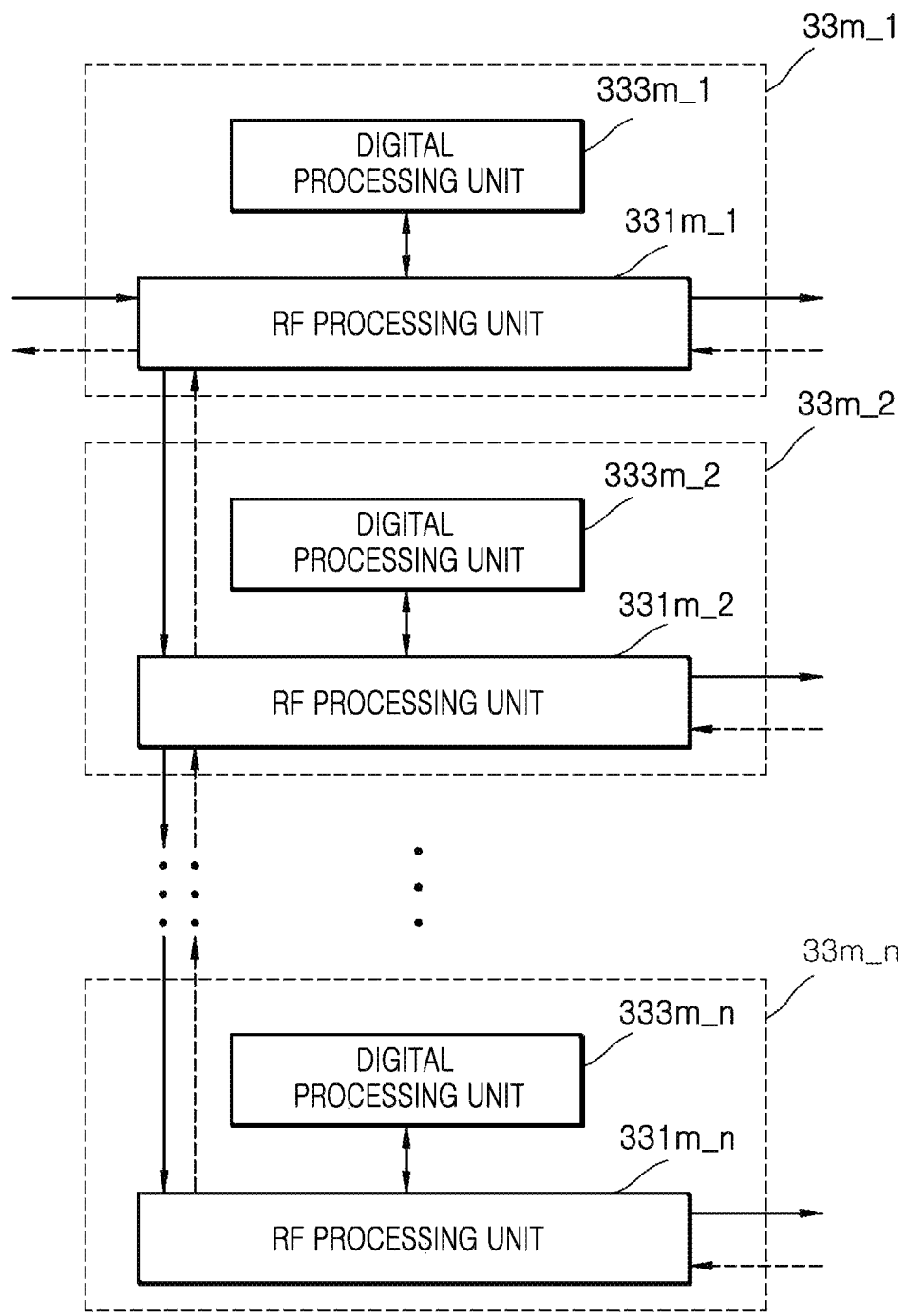
FIGS. 7 to 10 are exemplary diagrams showing in detail some components of band processing units according to embodiments of the inventive concept.
Figure 8:
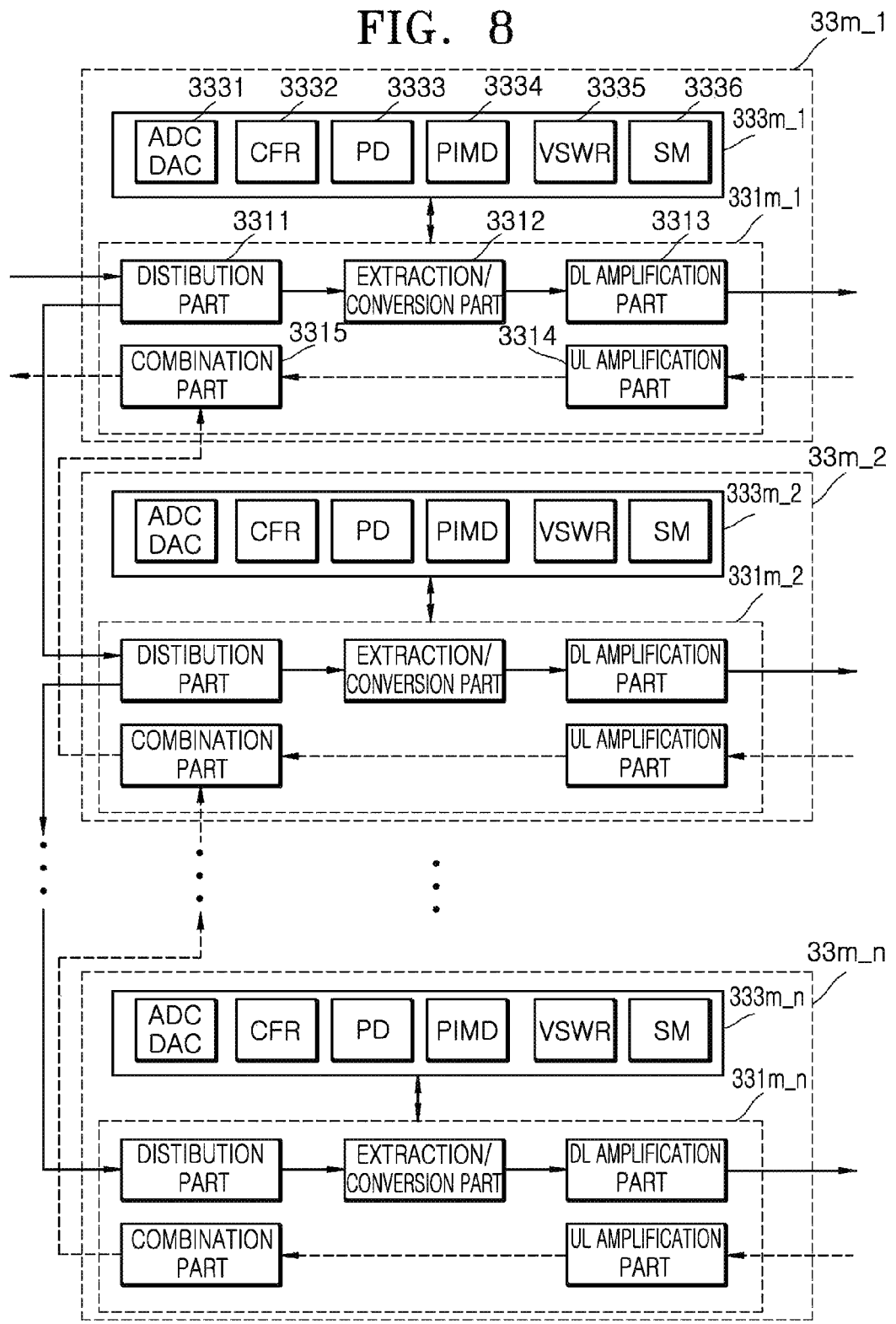

Although not shown in FIGS. 7 and 8, the distribution part 3311 may include an amplifier, and compensate for a loss due to the distribution of the downlink signal by using the amplifier. According to an implementation example, the amplifier may be implemented as a module separated from the distribution part 3311.

Meanwhile, a distribution part of the main-side band processing units at the rearmost end (i.e., the nth main-side band processing unit 33*m*_n) does not distribute, to another main-side band processing unit, a downlink transmission signal transmitted from a main-side band processing unit at the front end thereof (i.e., the (n−1)th main-side band processing unit 33*m*_n−1), but may transmit the downlink transmission signal to only a corresponding extraction/conversion part.

The extraction/conversion part 3312 may pass a downlink RF signal in a corresponding frequency band among a plurality of frequency bands included in the transmitted downlink transmission signal. The extraction/conversion part 3312 may convert the extracted downlink RF signal into an intermediate frequency (IF) signal and output the converted IF signal to the digital processing unit 333*m*_1.

The DL amplification part 3313 may amplify a downlink RF signal subjected to predetermined digital processing by the digital processing unit 333*m*_1, e.g., a downlink RF signal that is subjected to crest factor reduction by a CFR part (hereinafter, referred to as CFR) 3332 and subjected to predistortion by a PD part (hereinafter, referred to as PD) 3333. The DL amplification part 3313, for example, may be provided with a high-output amplifier. The DL amplification part 3313 may output the amplified downlink RF signal to the first main-side DL/UL dividing unit 34*m*_1.

The UL amplification part 3314 may amplify an uplink RF signal transmitted from the first main-side DL/UL dividing unit 34*m*_1 and output the amplified uplink RF signal to the combination part 3315. The UL amplification part 3314, for example, may be provided with a low-noise amplifier.

The combination part 3315 may generate an uplink transmission signal by combining the uplink RF signal amplified by the UL amplification part 3314 and an uplink RF signal amplified by a band process at the rear end thereof (i.e., the second main-side band processing unit 33*m*_2) and then transmitted. The combination part 3315 may transmit the generated uplink transmission signal to the main-side interface unit 32*m*. Since the first main-side band processing unit 33*m*_1 is disposed at the frontmost end, uplink RF signals in all frequency bands, processed by band processing units connected to the rear end of the first main-side band processing unit 33*m*_1 among the second to nth main-side band processing units 33*m*_2 to 33*m*_n may be included in the uplink transmission signal generated by the combination part 3315.

Although not shown in FIGS. 7 and 8, the combination part 3315 may include an amplifier, and compensate for a loss due to the combination of an uplink RF signal output from the UL amplification part 3314 and an uplink RF signal transmitted from a combination part of the second main-side band processing unit 33*m*_2 by using the amplifier. Also, the combination part 3315 may include an attenuator, and adjust a gain of the uplink RF signal transmitted from the combination part of the second main-side band processing unit 33*m*_2 by using the attenuator. According to an implementation example, the amplifier and/or the attenuator may be implemented as a module separated from the combination part 3315.

Meanwhile, any band processing unit is not connected to the rear end of a combination part of the band processing unit at the rearmost end (i.e., the nth main-side band processing unit 33*m*_n), and therefore, the combination part of the band processing unit at the rearmost end may transmit only an uplink RF signal on which the combination part performs processing such as amplification to a combination part of a combination part of a band processing unit connected to the rear end thereof.

The digital processing unit 333m_1 may include a digital conversion and analog conversion part (hereinafter, referred to as ADC/DAC) 3331, a CFR 3332, a PD 3333, a PIMD measurement part (hereinafter, referred to as PIMD) 3334, a VSWR measurement part (hereinafter, referred to as VSWR) 3335, and a spectrum monitoring part (hereinafter, referred to as SM) 3336. According to an implementation example, the CFR 3332 and the PD 3333 may be implemented as an integrated module, and separated from the digital processing unit 333m_1.

The ADC/DAC 3331 may digitize an IF-converted downlink RF signal transmitted from the extraction/conversion part 3312 of the RF processing unit 331m_1. The ADC/DAC 3331 may again convert the digitized downlink RF signal subjected to crest factor reduction and predistortion into an analog downlink RF signal, and output the converted analog downlink RF signal to the DL amplification part 3313. The ADC/DAC 3331 may provide a signal conversion function when a signal is transmitted between the RF processing unit 331m_1 and the PIMD 3334, the VSWR 3335, and the SM 3336. In FIG. 8, it is illustrated that the ADC/DAC 3331 is implemented as one module, but it will be apparent that an ADC for digital conversion and DAC for analog conversion may be implemented as modules separated from each other.

The CFR 3332 may perform crest factor reduction on the digitized downlink RF signal. The crest factor reduction, for example, may be performed by using peak cancellation crest factor reduction (PC-CFR).

The PD 3333 may perform predistortion for compensating for linearity of the DL amplification part 3313 on the downlink RF signal subjected to the crest factor reduction.

The PIMD 3334 may generate a predetermined test signal, and measure a degree of passive intermodulation distortion caused by the RF processing unit 331m_1 by using the generated test signal. For example, the PIMD 3334 may transmit, to the RF processing unit 331m_1, a test signal in a specific frequency band of the RF processing unit 331m_1, and measure a degree of passive intermodulation distortion, based on an intermodulation (IM) signal output by the RF processing unit 331m_1 in response to the test signal.

The VSWR 3335 may measure a voltage standing wave ratio on an internal signal path of the RF processing unit 331m_1. For example, the VSWR 3335 may measure a voltage standing wave ratio at at least one input or output end in the distribution part 3311, the extraction/conversion part 3312, and the DL amplification part 3313. Also, the VSWR 3335 may measure a voltage standing wave ratio at at least one input or output end in the UL amplification part 3314 and the combination part 3315.

The SM 3336 may monitor frequency spectra of various signals on the internal signal path of the RF processing unit 331m_1. For example, the SM 3336 may monitor spectra of downlink RF signals at at least one input or output end in the distribution part 3311, the extraction/conversion part 3312, and the DL amplification part 3313. Also, the SM 3336 may monitor spectra of downlink RF signals at at least one input or output end in the UL amplification port 3314 and the combination part 3315.

Next, another embodiment of the first main-side band processing unit 33m_1 will be described with reference to FIGS. 7 and 9. Like the embodiment shown in FIG. 8, the first main-side band processing unit 33m_1 may include the RF processing unit 331m_1 and the digital processing unit 333m_1. Unlike the embodiment shown in FIG. 8, the digital processing unit 333m_1 may include only the ADC/DAC 3331, the PIMD 3334, the VSWR 3335, and the SM 3336, excluding the CFR 3332 and the PD 3333. For example, the embodiment shown in FIG. 9 illustrates a case where the CFR 3332 and the PD 3333 are separated from the digital processing unit 333m_1.

Figure 9:
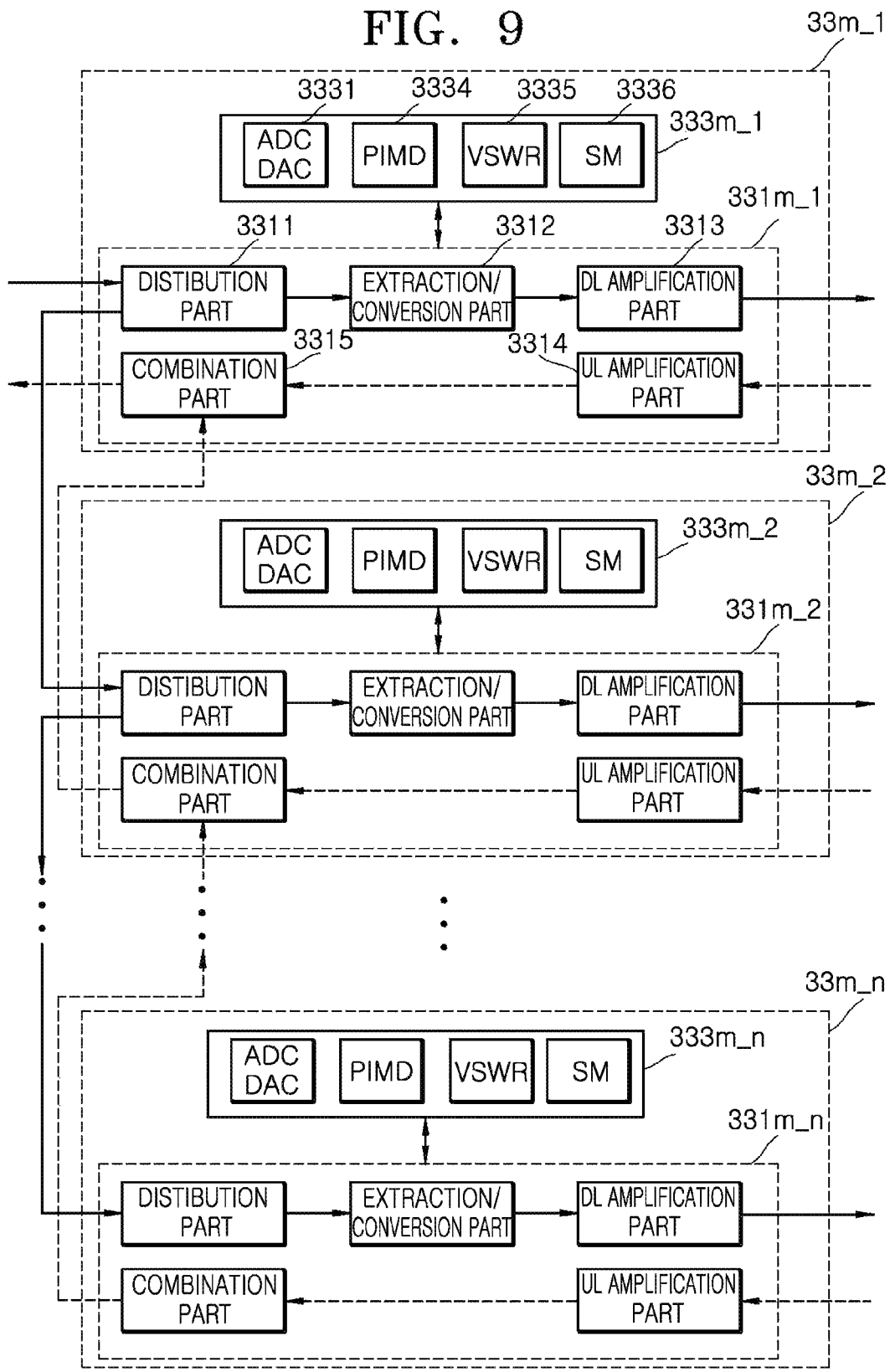

In this case, in the first main-side band processing unit 33m_1 shown in FIG. 9, the DL amplification part 3313 of the RF processing unit 331m_1 may directly amplify a downlink RF signal extracted by the extraction/conversion part 3312 and output the amplified downlink RF signal to the first main-side DL/UL dividing unit 34m_1.

Next, still another embodiment of the first main-side band processing unit 33m_1 will be described with reference to FIG. 10. Unlike the embodiments shown in FIGS. 8 and 9, the first main-side band processing unit 33m_1 may include only components for RF processing.

Figure 10:
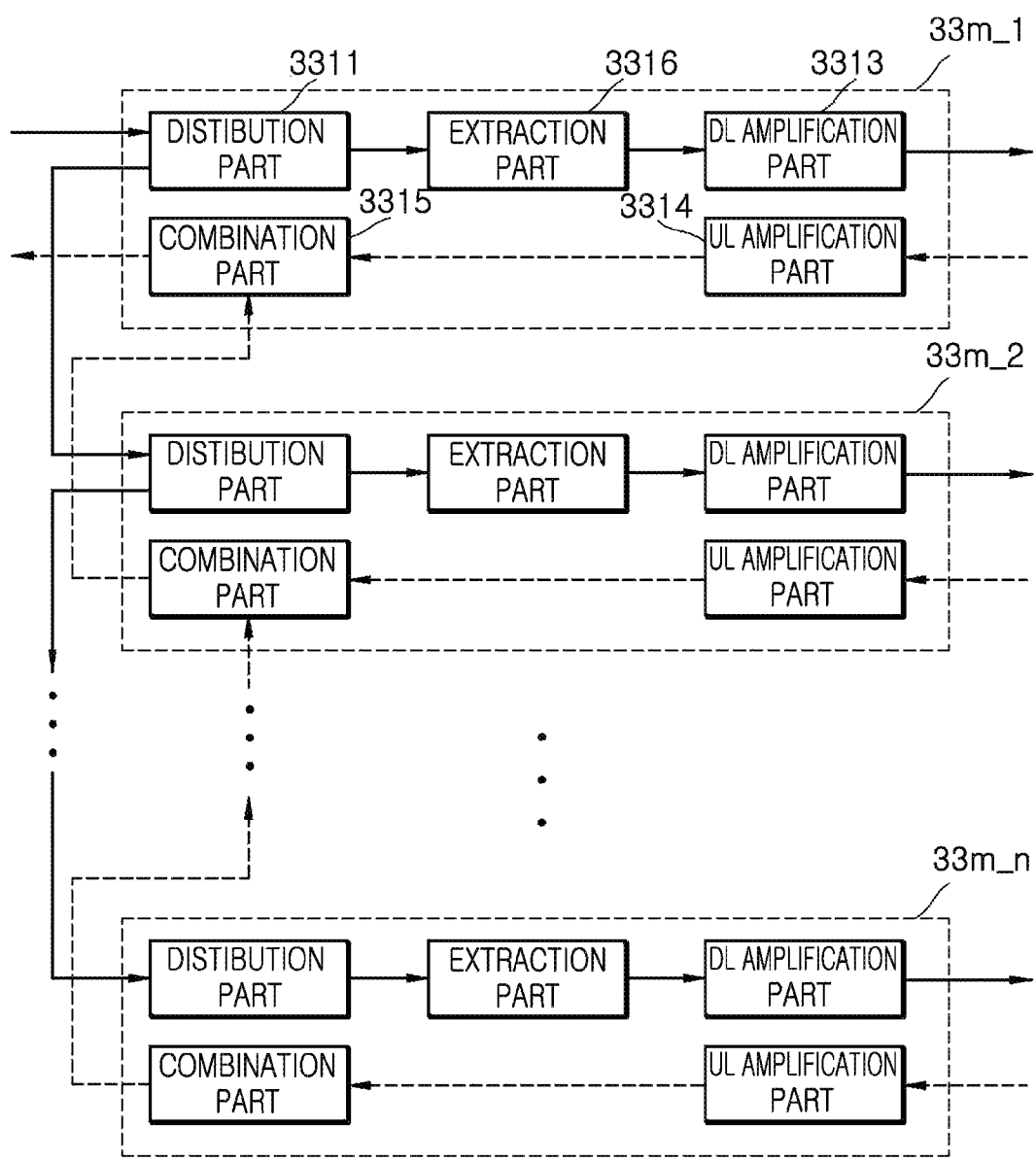

In this case, unlike the embodiments shown in FIGS. 8 and 9, in the first main-side band processing unit 33m_1 shown in FIG. 10, the extraction part 3316 may pass a downlink RF signal in a corresponding frequency band among a plurality of frequency bands included in downlink transmission signals transmitted from the distribution part 3311, and the DL amplification part 3313 may amplify a downlink RF signal extracted from the extraction part 3316 and output the amplified downlink RF signal to the first main-side DL/UL dividing unit 34m_1.

As such, the RF processing unit 331m_1 and/or the digital processing unit 333m_1 are implemented in a modular structure, and at least one of internal components of the digital processing unit 333m_1 is implemented as a separable module, so that the first to nth main-side band processing unit 33m_1 to 33m_n can be variously configured according to an operational environment required in the DAS.

Figure 11:
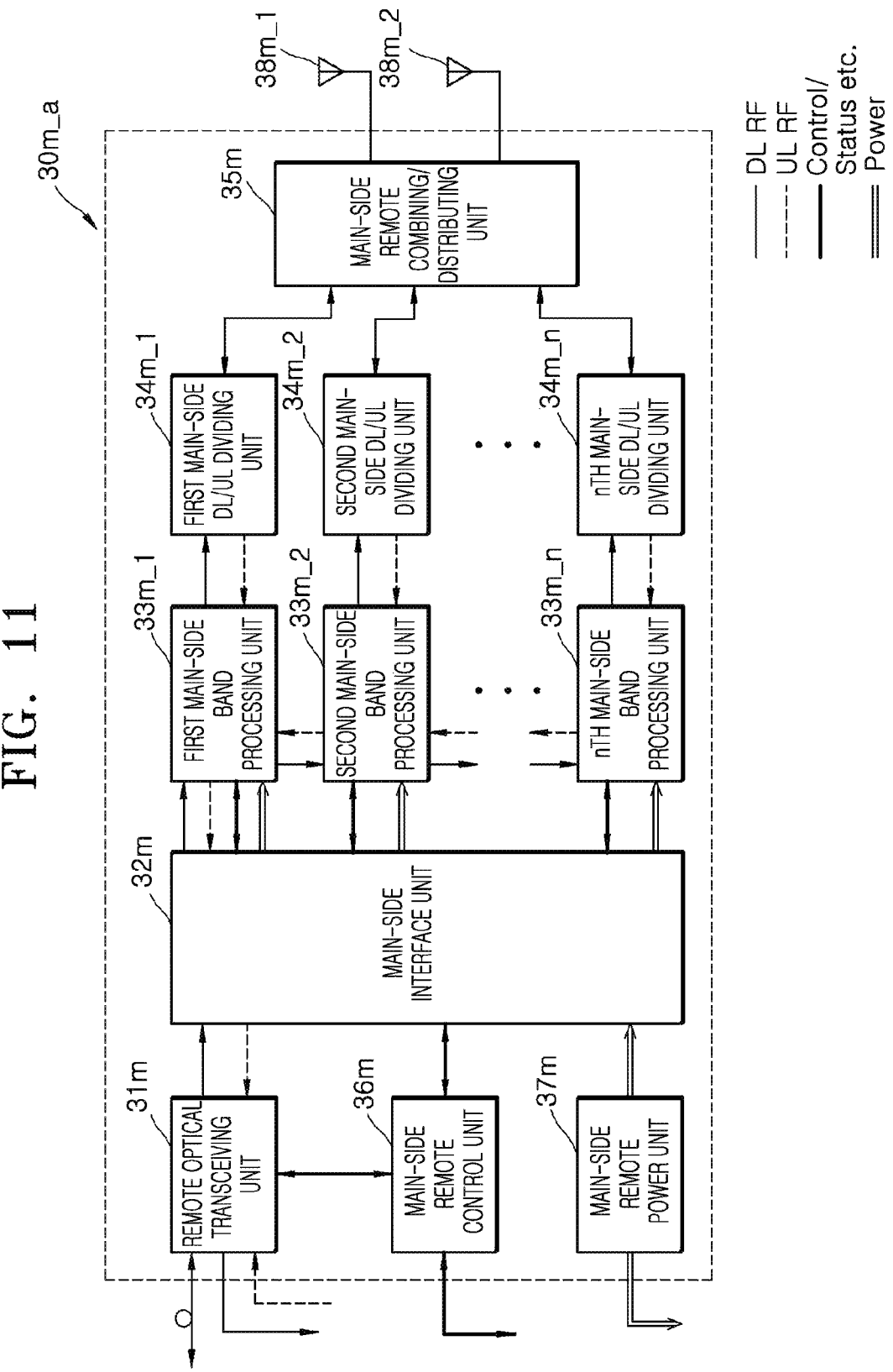
FIGS. 11 to 13 are diagrams schematically showing some components of main remote devices according to embodiments of the inventive concept.

FIGS. 11 to 13 are diagrams schematically showing some components of main remote devices according to embodiments of the inventive concept. In FIGS. 11 to 13, modifications of the first to nth main-side DL/UL dividing units 34m_1 to 34m_n, the main-side remote combining/distributing unit 35m, and the main-side antenna 38m in the main remote device 30m shown in FIG. 4 are illustrated. However, it will be apparent that the first to nth DL/UL dividing units 34s_1 to 34s_n, the sub-side remote combining/distributing unit 35s, and the sub-side antenna 38s in the sub-remote device 30s may also have components corresponding to those of the modification shown in any one of FIGS. 11 to 13. Hereinafter, for convenience of illustration, the embodiments of the inventive concept will be described with reference to FIGS. 11 to 13 together with FIG. 4. In description of FIGS. 11 to 13, descriptions overlapping with those of FIG. 4 will be omitted, and differences will be mainly described.

First, referring to FIG. 11, the main remote device 30m_a may include a remote optical transceiving unit 31m, a main-side interface unit 32m, first to nth main-side band processing unit 33m_1 to 33m_n, first to nth main-side DL/UL dividing unit 34m_1 to 34m_n, a main-side remote combining/distributing unit 35m, a main-side remote control unit 36m, a main-side remote power unit 37m, and first and second antenna 38m_1 and 38m_2. For example, unlike the main remote device 30m, the main remote device 30m_a may include a plurality of antenna.

The remote combining/distributing unit 35m may be connected to first and second antennas 38m_1 and 38m_2. The remote combining/distributing unit 35m may combine downlink RF signals output from the first to nth main-side DL/UL dividing unit 34m_1 to 34m_n, and distribute the combined downlink RF signal to the first and second main-side antennas 38m_1 and 38m_2. In another embodiment, the remote combining/distributing unit 35m may combine some downlink RF signals output from the first to nth main-side DL/UL dividing units 34m_1 to 34m_n and transmit the combined downlink RF signal to the first main-side antenna 38m_1. The remote combining/distributing unit 35m may combine other some downlink RF signals output from the first to nth main-side DL/UL dividing units 34m_1 to 34m_n and transmit the combined downlink RF signal to the second main-side antenna 38m_2.

The main-side remote combining/distributing unit 35m may receive an uplink signal transmitted from a user terminal through the first and second main-side antenna 38m_1 and 38m_2, and distribute the uplink signal to the first to nth main-side DL/UL dividing unit 34m_1 to 34m_n.

Referring to FIG. 12, the main remote device 30m_b may include a remote optical transceiving unit 31m, a main-side interface unit 32m, first to nth main-side band processing unit 33m_1 to 33m_n, first to nth main-side DL/UL dividing unit 34m_1 to 34m_n, a main-side remote control unit 36m, a main-side remote power unit 37m, and first to nth main-side antenna 38m_1 to 38m_n. For example, unlike the main remote device 30m shown in FIG. 4, the remote combining/distributing unit may be omitted in the main remote device 30m_b.

Each of the first to nth main-side DL-UL dividing unit 34m_1 to 34m_n may be connected to a corresponding main-side antenna among the first to nth main-side antenna 38m_1 to 38m_n, and transmit a downlink RF signal subjected to signal processing such as amplification to the corresponding main-side antenna among the first to nth main-side antenna 38m_1 to 38m_n.

Each of the first to nth main-side DL-UL dividing unit 34m_1 to 34m_n may extract an uplink RF signal in a frequency band required in a main-side band processing unit connected thereto from the uplink signal transmitted from the corresponding main-side antenna among the first to nth main-side antenna 38m_1 to 38m_n, and transmit the extracted uplink RF signal to the connected main-side band processing unit.

Referring to FIG. 13, the main remote device 30m_c may include a remote optical transceiving unit 31m, a main-side interface unit 32m, first to nth main-side band processing units 33m_1 to 33m_n, a main-side remote combining/distributing unit 35m, a main-side remote control unit 36m, a main-side remote power unit 37m, and a main-side remote antenna 38m. For example, unlike the main remote device 30m shown in FIG. 4, the first to nth main-side DL/UL dividing units may be omitted in the main remote device 30m_c. Meanwhile, in FIG. 12, it is illustrated that one main-side antenna 38m is connected to the main-side remote combining/distributing unit 35m. However, the inventive concept is not limited thereto, and it will be apparent that, like the main-remote device 30m_a shown in FIG. 10, a plurality of antenna may be connected to the main-side remote combining/distributing unit 35m. The remote combining/distributing unit 35m may be connected to the first to nth main-side band processing units 33m_1 to 33m_n. The remote combining/distributing unit 35m may combine downlink RF signals output from the first to nth main-side band processing units 33m_1 to 33m_n and transmit the combined downlink RF signal to the main-side antenna 38m.

The main-side remote combining/distributing unit 35m may receive an uplink signal transmitted from a user terminal through the main-side antenna 38m, separate, from the uplink signal, uplink RF signals respectively required in the first to nth main-side band processing units 33m_1 to 33m_n, and transmit the separated uplink RF signal to a corresponding band processing unit among the first to nth main-side band processing units 33m_1 to 33m_n.

While the inventive concept has been described with respect to the specific embodiments, it will be apparent to those skilled in the art that various changes and modifications may be made without departing from the spirit and scope of the inventive concept as defined in the following claims.

What is claimed is:

1. A distributed antenna system, comprising:
   a headend device configured to generate a downlink transmission signal by combining a plurality of downlink RF signals in different frequency bands, received from at least one base station, and convert the downlink transmission signal into a downlink optical signal; and
   a first remote device configured to receive the downlink optical signal from the headend device, convert the downlink optical signal into the downlink transmission signal, and amplify the downlink RF signals included in the downlink transmission signal,
   wherein the first remote device includes a plurality of first band processing units connected to each other to transmit the downlink transmission signal from a front end to a rear end thereof, the first band processing units each amplifying a downlink RF signal in a corresponding frequency band among the downlink RF signals included in the downlink transmission signal.

2. The distributed antenna system of claim 1, wherein the first remote device further includes:
   an optical transceiving unit configured to convert the downlink optical signal into the downlink transmission signal; and
   a first interface unit configured to receive the downlink transmission signal from the optical transceiving unit, and transmit the downlink transmission signal to a first band processing unit at the frontmost end among the first band processing units.

3. The distributed antenna system of claim 2, wherein the first remote device further includes a control unit configured to control the first band processing units,
   wherein the first interface unit receives a plurality of control signals for each controlling a corresponding first band processing unit among the first band processing units from the control unit, and transmits the control signals to the respective corresponding first band processing units.

4. The distributed antenna system of claim 2, wherein the first remote device further includes a first power unit configured to generate first driving power for driving the first band processing units,
   wherein the first interface unit configured to receive the first driving power from the first power unit, and transmit the first driving power to the first band processing units.

5. The distributed antenna system of claim 1, wherein at least one of the first band processing units includes:
   a RF processing unit configured to distribute the downlink transmission signal to a first band processing unit at a rear end thereof, and extract a downlink RF signal in a corresponding frequency band among the downlink RF signals included in the downlink transmission signal; and
   a digital processing unit configured to perform crest factor reduction and predistortion on the extracted downlink RF signal, wherein the RF processing unit configured to amplify and output the downlink RF signal subjected to the crest factor reduction and predistortion by the digital processing unit.

6. The distributed antenna system of claim 5, wherein the digital processing unit further includes at least one of a spectrum monitoring part configured to monitor at least one spectrum among the downlink transmission signal, the extracted downlink RF signal, and the amplified downlink RF signal, a PIMD (passive intermodulation distortion) measurement part configured to generate a predetermined test signal and measure a degree of PIMD caused by the RF processing unit by using the test signal, and VSWR (voltage standing wave ratio) measurement part configured to measure a VSWR on a signal path of the RF processing unit.

7. The distributed antenna system of claim 1, wherein at least one of the first band processing units includes a RF processing unit configured to distribute the downlink transmission signal to a first band processing unit at a rear end thereof, extract a downlink RF signal in a corresponding frequency band among the downlink RF signals included in the downlink transmission signal, and amplify and output the extracted downlink RF signal.

8. The distributed antenna system of claim 7, wherein at least one of the first band processing units further includes a digital processing unit, the digital processing unit includes at least one of a spectrum monitoring part configured to monitor at least one spectrum among the downlink transmission signal, the extracted downlink RF signal, and the amplified downlink RF signal, a PIMD (passive intermodulation distortion) measurement part configured to generate a predetermined test signal and measure a degree of PIMD caused by the RF processing unit by using the test signal, and VSWR (voltage standing wave ratio) measurement part configured to measure a VSWR on a signal path of the RF processing unit.

9. The distributed antenna system of claim 1, wherein the first remote device further includes:
a plurality of downlink (DL)/uplink (UL) dividing units each connected to a corresponding first band processing unit among the first band processing units, the DL/UL dividing units receiving an amplified downlink RF signal output from the corresponding first band processing unit; and
a combining/distributing unit connected to the DL/UL dividing units, and transmitting a plurality of amplified downlink RF signals transmitted from the DL/UL dividing units to at least one antenna.

10. The distributed antenna system of claim 1, wherein the first remote device further includes a plurality of DL/UL dividing units each connected to a corresponding first band processing unit among the first band processing units, the DL/UL dividing units receiving an amplified downlink RF signal output from the corresponding first band processing unit, the DL/UL dividing units transmitting the amplified downlink RF signal to a corresponding antenna among a plurality of antennas.

11. The distributed antenna system of claim 1, wherein the first remote device further includes a combining/distributing unit connected to the first band processing units, the combining/distributing unit transmitting the amplified downlink RF signals output from the first band processing units to at least one antenna.

12. The distributed antenna system of claim 1, further comprising a second remote device configured to receive the downlink transmission signal distributed from the first remote device, and amplify the downlink RF signals included in the received downlink transmission signal.

13. The distributed antenna system of claim 12, wherein the second remote device includes a plurality of second band processing units connected to each other to transmit the received downlink transmission signal from a front end to a rear end thereof, the second band processing units each amplifying a downlink RF signal in a corresponding frequency band among the downlink RF signals included in the received downlink transmission signal.

14. The distributed antenna system of claim 13, wherein the first remote device further includes an optical transceiving unit configured to convert the downlink optical signal to the downlink transmission signal, and distribute the downlink transmission signal to the second remote device, and
wherein the second remote device further includes a second interface unit configured to receive the downlink transmission signal from the optical transceiving unit of the first remote device, transmit the received downlink transmission signal to a second band processing unit at the frontmost end among the second band processing units.

15. The distributed antenna system of claim 13, wherein the first remote device further includes a first power unit configured to distribute supplied power to the second remote device, and generate first driving power for driving the first band processing units based on the power, and
wherein the second remote device further includes a second power unit configured to receive the power distributed from the first power unit of the first remote device, and generate second driving power for driving the second band processing units based on the received power.

16. The distributed antenna system of claim 12, further comprising a combining/distributing device configured to receive a plurality of downlink RF signals amplified by the first remote device, receive a plurality of downlink RF signals amplified by the second remote device, combine the plurality of downlink RF signals amplified by the first remote device and the second remote device, and transmit the combined downlink RF signal to at least one antenna.

17. A remote device of a distributed antenna system, comprising:
an optical transceiving unit configured to convert a received downlink optical signal into a downlink transmission signal;
an interface unit configured to receive the downlink transmission signal from the optical transceiving unit, output the downlink transmission signal according to a predetermined downlink path;
a first processing unit configured to receive the downlink transmission signal from the interface unit, and amplify a first downlink RF signal among a plurality of downlink RF signals having in a different frequency included in the downlink transmission signal; and
a second processing unit configured to receive the downlink transmission signal from the first processing unit, and amplify a second downlink RF signal among the downlink RF signals included in the downlink transmission signal.

18. The remote device of claim 17, wherein, when a connection between the interface unit and the first processing unit is released and a connection between the interface unit and the second processing unit is maintained, the downlink path is reset so that the first interface unit transmits the downlink transmission signal to the second processing unit.

19. A distributed antenna system, comprising:
a headend device configured to generate a downlink transmission signal by combining a plurality of downlink RF signals in different frequency bands, received from at least one base station, and convert the downlink transmission signal into a downlink optical signal;
a first remote device configured to receive the downlink optical signal from the headend device, convert the downlink optical signal into the downlink transmission signal, and amplify the downlink RF signals included in the downlink transmission signal; and
a second remote device configured to receive the downlink transmission signal distributed from the first remote device, and amplify the downlink RF signals included in the received downlink transmission signal,
wherein the second remote device includes a plurality of band processing units connected to each other to transmit the downlink transmission signal from a front end to a rear end thereof, the band processing units each amplifying a downlink RF signal in a corresponding frequency band among the downlink RF signals included in the received downlink transmission signal.

20. The distributed antenna system of claim 19, wherein the second remote device further includes:
an interface unit configured to receive the downlink transmission signal from the first remote device, transmit the received downlink transmission signal to a band processing unit at the frontmost end among the band processing units; and
a power unit configured to receive the power distributed from the first remote device, and generate driving power for driving the band processing units based on the received power.

* * * * *